(12) United States Patent
Kadam et al.

(10) Patent No.: US 8,521,101 B1
(45) Date of Patent: Aug. 27, 2013

(54) EXTRACTING CLOCK INFORMATION FROM A SERIAL COMMUNICATIONS BUS FOR USE IN RF COMMUNICATIONS CIRCUITRY

(75) Inventors: Dharma Reddy Kadam, Chandler, AZ (US); Christopher Truong Ngo, Chandler, AZ (US); Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 442 days.

(21) Appl. No.: 12/884,933

(22) Filed: Sep. 17, 2010

Related U.S. Application Data

(60) Provisional application No. 61/243,468, filed on Sep. 17, 2009, provisional application No. 61/357,727, filed on Jun. 23, 2010.

(51) Int. Cl.
*H04B 1/38* (2006.01)

(52) U.S. Cl.
USPC ............... 455/91; 455/78; 455/550; 375/350

(58) Field of Classification Search
USPC .......................................................... 455/91
See application file for complete search history.

(56) References Cited

U.S. PATENT DOCUMENTS

| | | | |
|---|---|---|---|
| 7,535,957 B2 | 5/2009 | Ozawa et al. | |
| 8,132,037 B2 | 3/2012 | Fehr et al. | |
| 8,396,508 B2 | 3/2013 | van Rooyen et al. | |
| 2006/0013009 A1 | 1/2006 | Falco, Jr. | |
| 2006/0128425 A1 | 6/2006 | Rooyen | |
| 2009/0067388 A1 | 3/2009 | van Rooyen et al. | |
| 2009/0117858 A1* | 5/2009 | Furrer et al. | 455/78 |
| 2009/0161655 A1 | 6/2009 | Uppala | |
| 2012/0236976 A1* | 9/2012 | Smith | 375/350 |

OTHER PUBLICATIONS

Non-Final Office Action for U.S. Appl. No. 12/884,981, mailed May 13, 2013, 9 pages.

* cited by examiner

*Primary Examiner* — Ajibola Akinyemi
(74) *Attorney, Agent, or Firm* — Withrow & Terranova, P.L.L.C.

(57) ABSTRACT

The present disclosure relates to RF front-end (RFFE) circuitry that includes multiple RFFE circuits, each of which may be provided by a separate integrated circuit (IC), front-end module, or both. As such, the RFFE circuits may be connected to one another using an RFFE serial communications bus. Further, one or more of the RFFE circuits may need an accurate clock source for analog-to-digital conversion (ADC), digital-to-analog conversion (DAC), calibration, sensor measurements, or the like. Instead of including an integral clock source circuit or receiving a separate external clock signal, an RFFE circuit may extract clock information from the RFFE serial communications bus to provide one or more clock signal. The clock information may be associated with one or more serial communications command via the RFFE serial communications bus, may be associated with alternate functionality of the RFFE serial communications bus, or both.

19 Claims, 21 Drawing Sheets

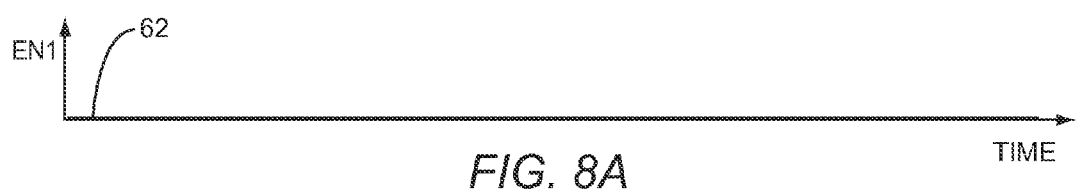
FIG. 8A
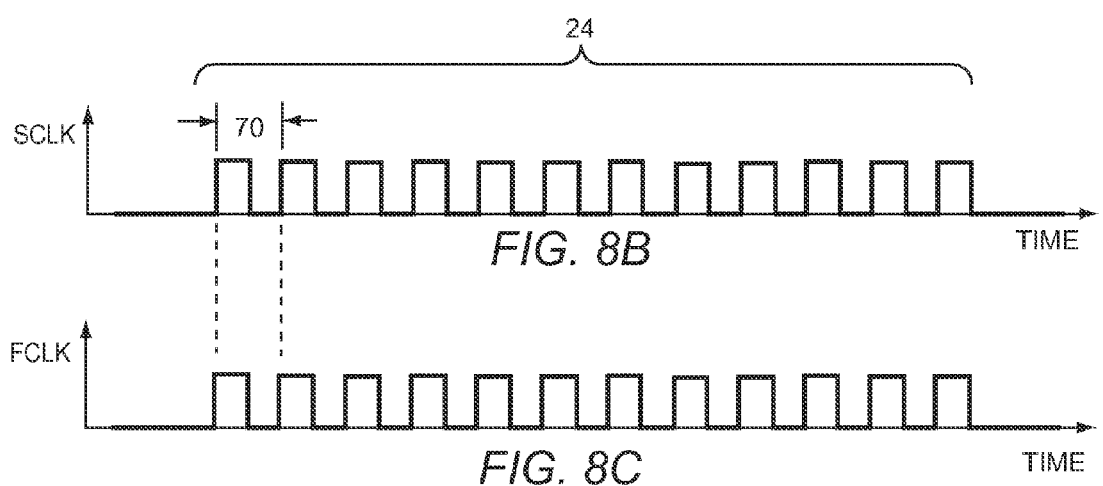
FIG. 8B
FIG. 8C

US 8,521,101 B1

EXTRACTING CLOCK INFORMATION FROM A SERIAL COMMUNICATIONS BUS FOR USE IN RF COMMUNICATIONS CIRCUITRY

RELATED APPLICATIONS

This application is related to U.S. patent application Ser. No. 12/884,981 entitled EXTRACTING CLOCK INFORMATION USING SERIAL COMMUNICATIONS COMMANDS FOR USE IN RF COMMUNICATIONS CIRCUITRY, filed Sep. 17, 2010, which is concurrently filed herewith and incorporated herein by reference in its entirety. Further, this application claims the benefit of provisional patent application Ser. No. 61/243,468, filed Sep. 17, 2009 and provisional patent application Ser. No. 61/357,727, filed Jun. 23, 2010, the disclosures of which are hereby incorporated herein by reference in their entireties.

FIELD OF THE DISCLOSURE

Embodiments of the present disclosure relate to serial communications signals and clock signals used in radio frequency (RF) communications circuitry.

BACKGROUND OF THE DISCLOSURE

As wireless communications technologies evolve, wireless communications systems become increasingly sophisticated. Multi-mode and multi-band wireless systems are routinely available. Such systems may partition different functions into different integrated circuits (ICs) or modules. For example, a wireless system may include circuit elements, such as a baseband processor, a transceiver, control circuitry, receive circuitry, transmit circuitry, or the like. Such circuit elements may be interconnected to one another and communicate with one another using at least one serial communications signal. A serial communications signal may include at least one digital signal for transferring digital data serially from one circuit element to another circuit element. A synchronous serial communications signal includes a digital clock signal or a digital signal having embedded clock information, which is used to extract digital data from the synchronous serial communications signal. The serial communications signal may be used for configuration, initialization, testing, calibration, the like, or any combination thereof. As such, the serial communications signal may be used to transfer data only intermittently. Generally, serial communications requires fewer digital signals than other forms of digital communications, such as parallel communications. Therefore, each circuit element may require fewer connections, thereby reducing size, cost, and complexity. Other techniques to further reduce circuit element connections may further reduce size, cost, and complexity.

SUMMARY OF THE EMBODIMENTS

The present disclosure relates to RF front-end (RFFE) circuitry that includes multiple RFFE circuits, each of which may be provided by a separate integrated circuit (IC), front-end module, or both. As such, the RFFE circuits may be connected to one another using an RFFE serial communications bus. Further, one or more of the RFFE circuits may need an accurate clock source for analog-to-digital conversion (ADC), digital-to-analog conversion (DAC), calibration, sensor measurements, or the like. To minimize complexity of each RFFE circuit and to keep pin counts low, instead of including an integral clock source circuit or receiving a separate external clock signal, an RFFE circuit may extract clock information from the RFFE serial communications bus to provide one or more clock signal. The clock information may be associated with one or more serial communications command via the RFFE serial communications bus, may be associated with alternate functionality of the RFFE serial communications bus, or both.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8A is a graph illustrating the first enable signal illustrated in FIGS. 3C, 3D, 3G and 3H according to one embodiment of the first enable signal.

FIG. 8B is a graph illustrating the RFFE clock signal illustrated in FIGS. 3E-3H according to one embodiment of the RFFE clock signal.

FIG. 8C is a graph illustrating a first clock signal illustrated in FIG. 1 according to one embodiment of the first clock signal.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to RF front-end (RFFE) circuitry that includes multiple RFFE circuits, each of which may be provided by a separate integrated circuit (IC), front-end module, or both. As such, the RFFE circuits may be connected to one another using an RFFE serial communications bus. Further, one or more of the RFFE circuits may need an accurate clock source for analog-to-digital conversion (ADC), digital-to-analog conversion (DAC), calibration, sensor measurements, or the like. To minimize complexity of each RFFE circuit and to keep pin counts low, instead of including an integral clock source circuit or receiving a separate external clock signal, an RFFE circuit may extract clock information from the RFFE serial communications bus to provide one or more clock signal. The clock information may be associated with one or more serial communications command via the RFFE serial communications bus, may be associated with alternate functionality of the RFFE serial communications bus, or both.

Figure 1:
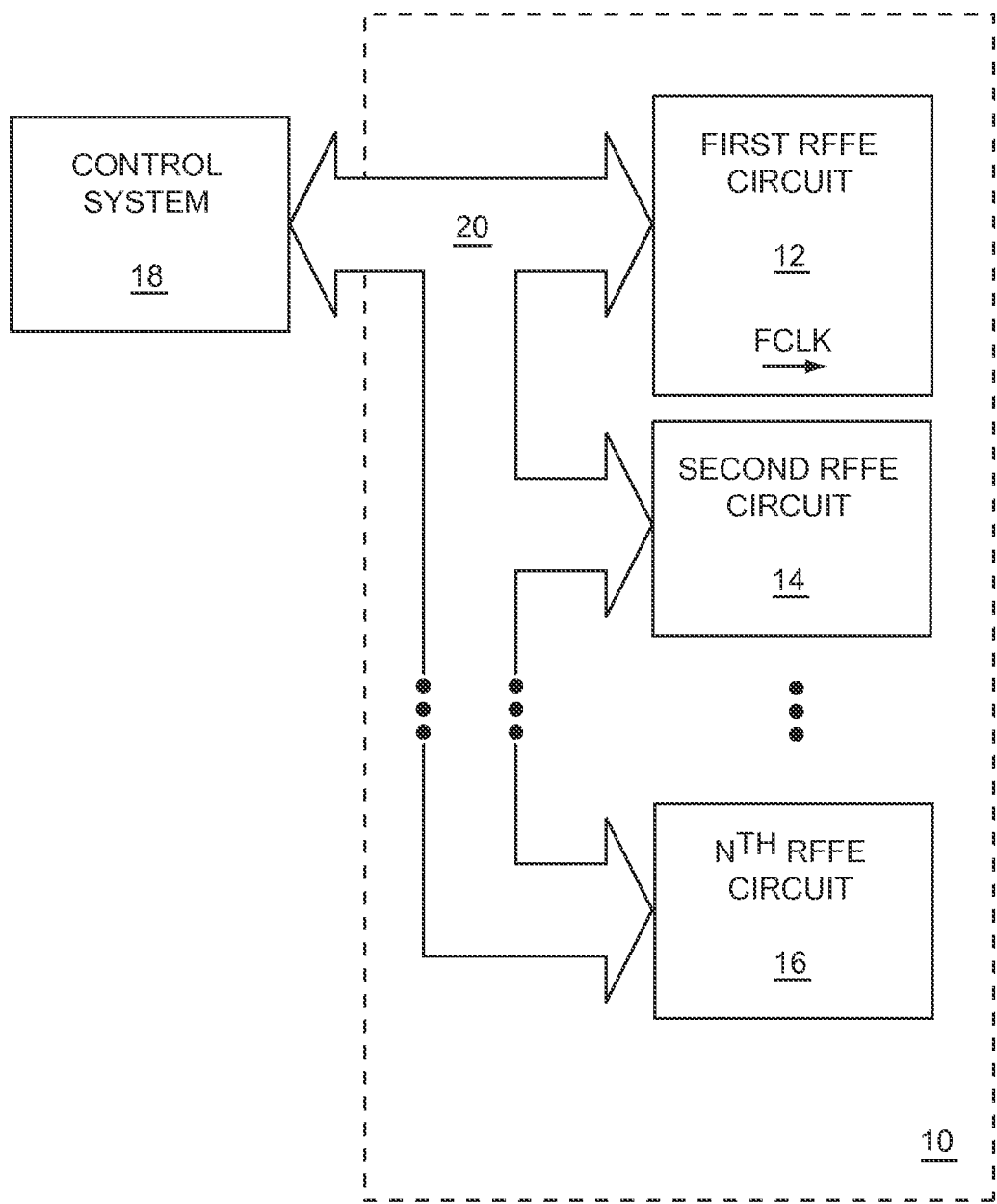
FIG. 1 shows RF front-end (RFFE) circuitry according to one embodiment of the RFFE circuitry.

FIG. 1 shows RFFE circuitry 10 according to one embodiment of the RFFE circuitry 10. The RFFE circuitry 10 includes a first RFFE circuit 12, a second RFFE circuit 14, and up to and including an $N^{TH}$ RFFE circuit 16. A control system 18 communicates with the RFFE circuits 12, 14, 16 via an RFFE serial communications bus 20. The RFFE circuitry 10 may include RF transmitter circuitry, RF receiver circuitry, antenna interface circuitry, switching circuitry, filter circuitry, sensors, calibration circuitry, power supply circuitry, control circuitry, the like, or any combination thereof partitioned in any manner amongst the RFFE circuits 12, 14, 16. Each of the RFFE circuits 12, 14, 16 may be provided by a single IC, multiple ICs, a single module, multiple modules, or any combination thereof. Any or all of the RFFE circuits 12, 14, 16 may extract or determine clock information 24 (FIGS. 3A-3F) that is provided by the RFFE serial communications bus 20 to generate one or more clock signals, such as a first clock signal FCLK in the first RFFE circuit 12.

The clock information 24 may be provided by the control system 18. Further, when operating, the control system 18 may select between a communications operating mode and a non-communications operating mode. During the communications operating mode, the control system 18 may provide multiple commands on the RFFE serial communications bus 20, such that each of the RFFE circuits 12, 14, 16 reacts to at least one or more of the multiple commands on the RFFE serial communications bus 20. In a first embodiment of the RFFE circuitry 10, any or all of the RFFE circuits 12, 14, 16 may extract or determine the clock information 24 during the non-communications operating mode. In a second embodiment of the RFFE circuitry 10, any or all of the RFFE circuits 12, 14, 16 may extract or determine the clock information 24 during the communications operating mode. In a third embodiment of the RFFE circuitry 10, any or all of the RFFE circuits 12, 14, 16 may extract or determine the clock information 24 during both the non-communications operating mode and the communications operating mode.

The RFFE serial communications bus 20 may be a primary communications bus or the RFFE serial communications bus 20 may be an auxiliary communications bus that receives, sends, or both, information to a primary communications bus via interposing circuitry (not shown). In one embodiment of the RFFE circuitry 10, N may be any whole number. In an alternate embodiment of the RFFE circuitry 10, N is zero, such that the RFFE circuitry 10 includes only the first RFFE circuit 12 and the second RFFE circuit 14. The RFFE serial communications bus 20 may be either a synchronous communications bus or an asynchronous communications bus. In either case, the clock information 24 may be extracted or determined. The RFFE serial communications bus 20 may be a one-wire bus, a two-wire bus, a three-wire bus, a four-wire bus, or a greater than four-wire bus. Examples of the RFFE serial communications bus 20 may include a Serial Peripheral Interface (SPI™) bus or an Inter-IC (I2C™) bus.

Figure 2:
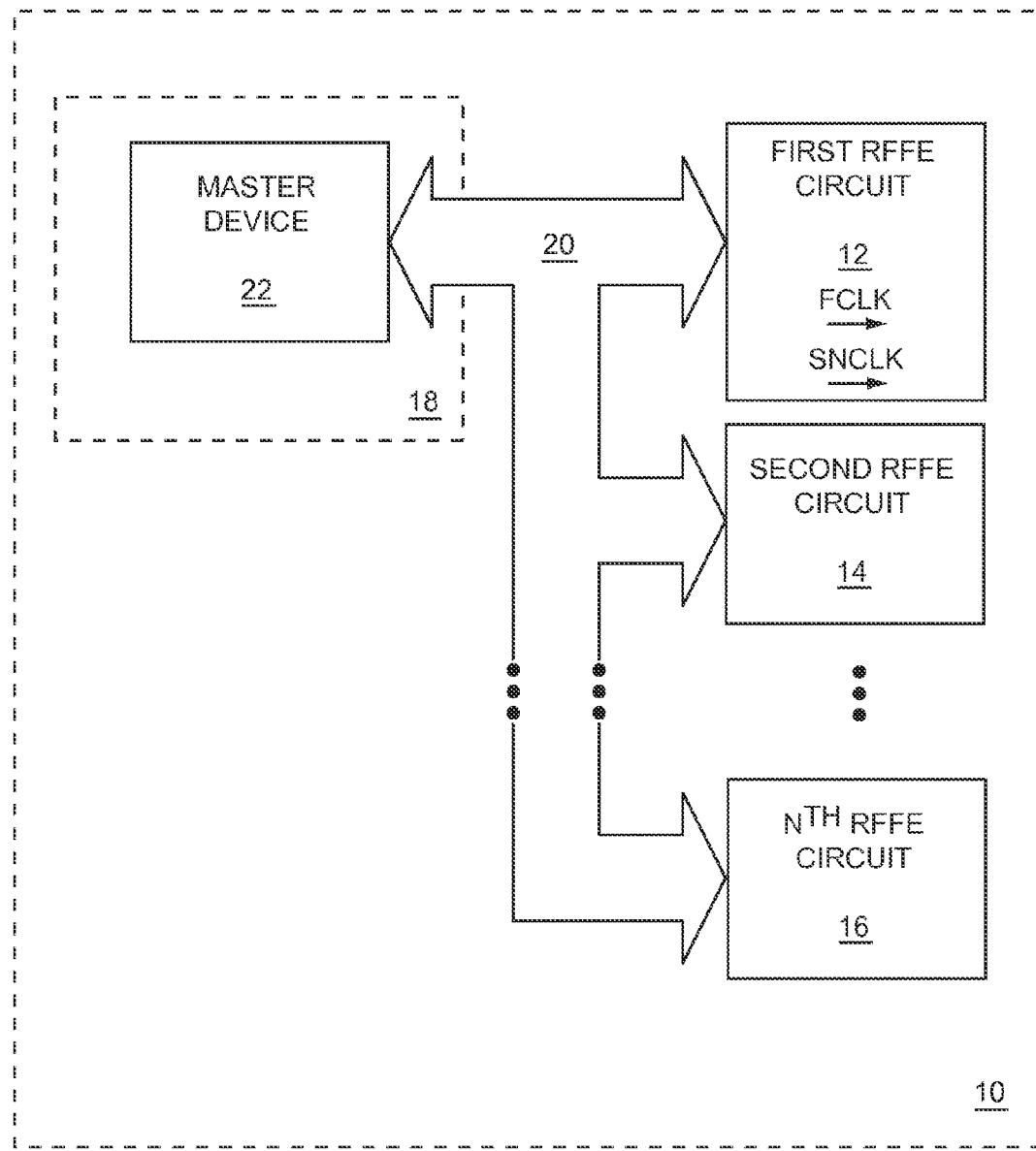
FIG. 2 shows the RFFE circuitry according to an alternate embodiment of the RFFE circuitry.

FIG. 2 shows the RFFE circuitry 10 according to an alternate embodiment of the RFFE circuitry 10. The RFFE circuitry 10 illustrated in FIG. 2 includes the control system 18 and the RFFE circuits 12, 14, 16. The control system 18 includes a master device 22 coupled to the RFFE serial communications bus 20. During the communications operating mode, the master device 22 may provide multiple commands on the RFFE serial communications bus 20, such that each of the RFFE circuits 12, 14, 16 reacts to at least one or more of the multiple commands on the RFFE serial communications bus 20. Any or all of the RFFE circuits 12, 14, 16 may be slave devices. The master device 22 may be coupled directly to the RFFE circuits 12, 14, 16 via the RFFE serial communications bus 20 as shown in FIG. 2, or the master device 22 may be coupled to the RFFE circuits 12, 14, 16 through interposing circuitry (not shown).

The first RFFE circuit 12 may extract or determine the clock information 24 that is provided by the RFFE serial communications bus 20 to generate the first clock signal FCLK, a second clock signal SNCLK, or both. In an alternate embodiment of the RFFE circuitry 10, the RFFE circuitry 10 does not include the control system 18.

Figure 3A:
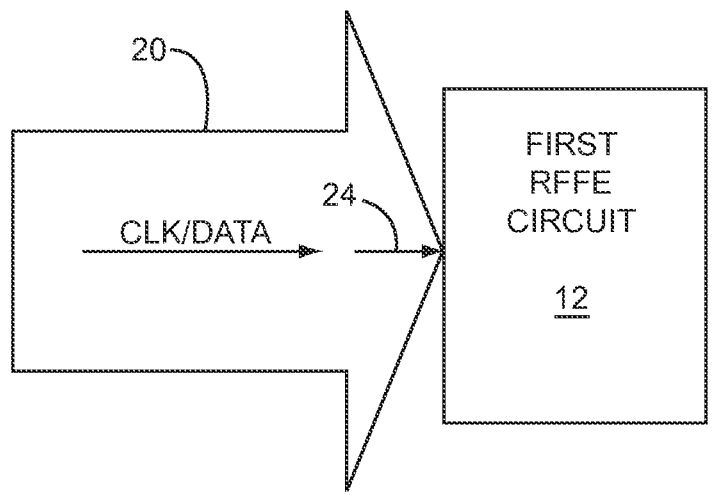
FIG. 3A shows a first RFFE circuit and a portion of an RFFE serial communications bus illustrated in FIG. 1 according to a first embodiment of the RFFE serial communications bus.

FIG. 3A shows the first RFFE circuit 12 and a portion of the RFFE serial communications bus 20 illustrated in FIG. 1 according to a first embodiment of the RFFE serial communications bus 20. The RFFE serial communications bus 20 illustrated in FIG. 3A is a one-wire bus, which has a uni-directional combined clock and data signal CLK/DATA that is received by the first RFFE circuit 12. During the communications operating mode, the commands provided by the control system 18 may be via the combined clock and data signal CLK/DATA. The clock information 24 is extracted or determined from the combined clock and data signal CLK/DATA.

Figure 3B:
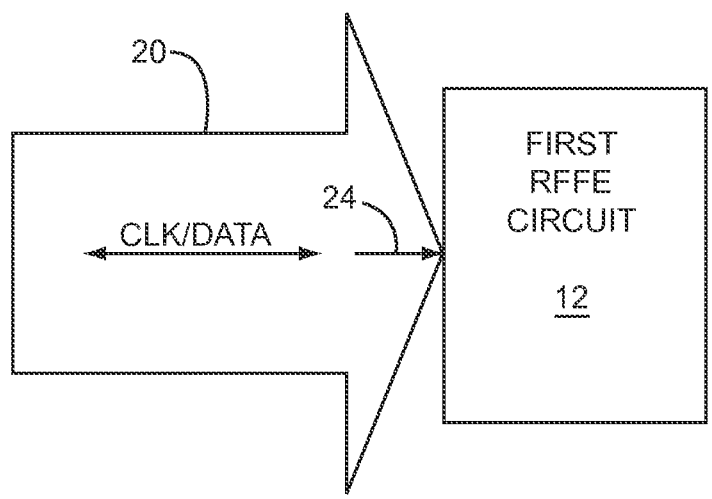
FIG. 3B shows the first RFFE circuit and a portion of the RFFE serial communications bus illustrated in FIG. 1 according to a second embodiment of the RFFE serial communications bus.

FIG. 3B shows the first RFFE circuit 12 and a portion of the RFFE serial communications bus 20 illustrated in FIG. 1 according to a second embodiment of the RFFE serial communications bus 20. The RFFE serial communications bus 20 illustrated in FIG. 3B is a one-wire bus, which has a bi-directional combined clock and data signal CLK/DATA that is received by, provided by, or both, the first RFFE circuit 12. During the communications operating mode, the commands provided by the control system 18 may be via the combined clock and data signal CLK/DATA. The clock information 24 is extracted or determined from the combined clock and data signal CLK/DATA.

Figure 3C:
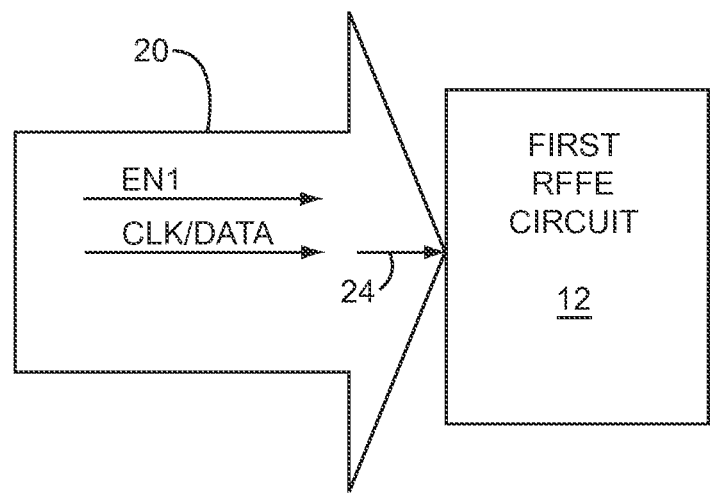
FIG. 3C shows the first RFFE circuit and a portion of the RFFE serial communications bus illustrated in FIG. 1 according to a third embodiment of the RFFE serial communications bus.

FIG. 3C shows the first RFFE circuit 12 and a portion of the RFFE serial communications bus 20 illustrated in FIG. 1 according to a third embodiment of the RFFE serial communications bus 20. The RFFE serial communications bus 20 illustrated in FIG. 3C is a two-wire bus, which has a uni-directional combined clock and data signal CLK/DATA and a uni-directional first enable signal EN1 that are received by the first RFFE circuit 12. During the communications operating mode, the commands provided by the control system 18 may be via the combined clock and data signal CLK/DATA and the first enable signal EN1. The clock information 24 is extracted or determined from the combined clock and data signal CLK/DATA.

Figure 3D:
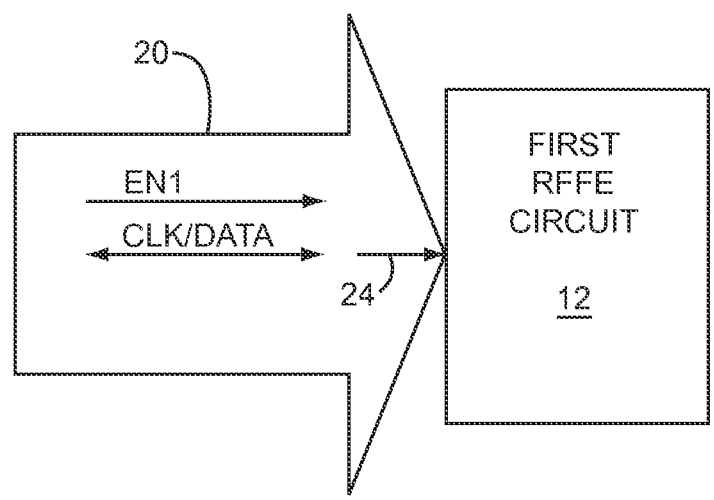
FIG. 3D shows the first RFFE circuit and a portion of the RFFE serial communications bus illustrated in FIG. 1 according to a fourth embodiment of the RFFE serial communications bus.

FIG. 3D shows the first RFFE circuit 12 and a portion of the RFFE serial communications bus 20 illustrated in FIG. 1 according to a fourth embodiment of the RFFE serial communications bus 20. The RFFE serial communications bus 20 illustrated in FIG. 3D is a two-wire bus, which has a bi-directional combined clock and data signal CLK/DATA and the first enable signal EN1, which may be bi-directional or uni-directional, that are received by, provided by, or both, the first RFFE circuit 12. During the communications operating mode, the commands provided by the control system 18 may be via the combined clock and data signal CLK/DATA and the first enable signal EN1. The clock information 24 is extracted or determined from the combined clock and data signal CLK/DATA. In one embodiment of the first enable signal EN1, during the communications operating mode, the first enable signal EN1 is in an asserted state, and during the non-communications operating mode, the first enable signal EN1 is in a de-asserted state.

Figure 3E:
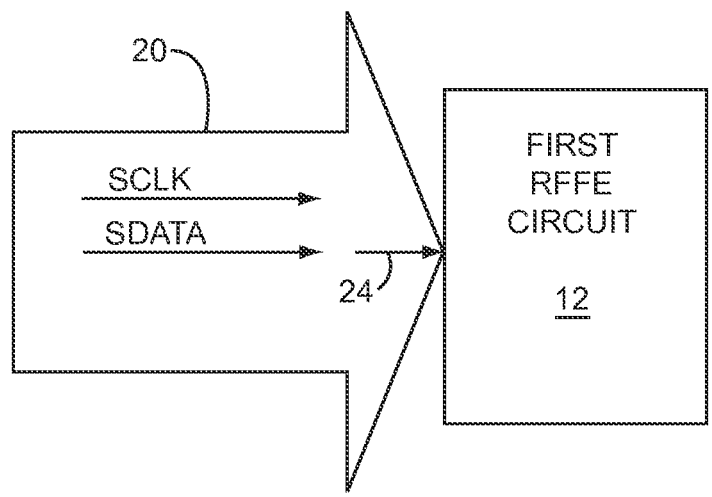
FIG. 3E shows the first RFFE circuit and a portion of the RFFE serial communications bus illustrated in FIG. 1 according to a fifth embodiment of the RFFE serial communications bus.

FIG. 3E shows the first RFFE circuit 12 and a portion of the RFFE serial communications bus 20 illustrated in FIG. 1 according to a fifth embodiment of the RFFE serial communications bus 20. The RFFE serial communications bus 20 illustrated in FIG. 3E is a two-wire bus, which has a uni-directional RFFE clock signal SCLK and a uni-directional RFFE data signal SDATA that are received by the first RFFE circuit 12. During the communications operating mode, the commands provided by the control system 18 may be via the RFFE clock signal SCLK and the RFFE data signal SDATA. The clock information 24 is extracted or determined from the RFFE clock signal SCLK, the RFFE data signal SDATA, or both.

Figure 3F:
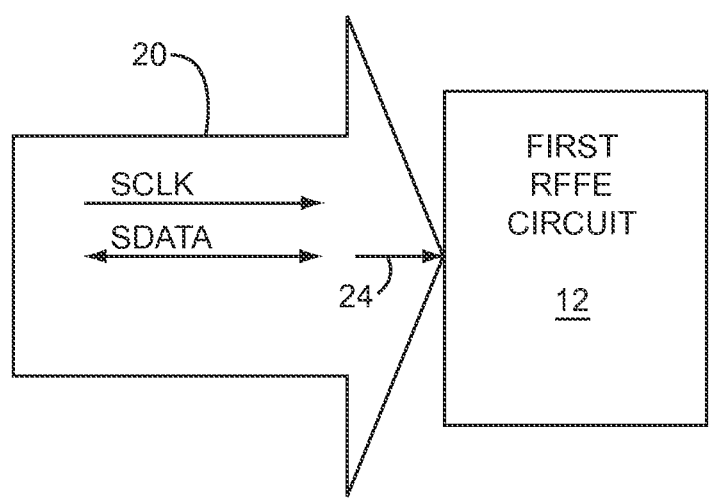
FIG. 3F shows the first RFFE circuit and a portion of the RFFE serial communications bus illustrated in FIG. 1 according to a sixth embodiment of the RFFE serial communications bus.

FIG. 3F shows the first RFFE circuit 12 and a portion of the RFFE serial communications bus 20 illustrated in FIG. 1 according to a sixth embodiment of the RFFE serial communications bus 20. The RFFE serial communications bus 20 illustrated in FIG. 3F is a two-wire bus, which has the RFFE clock signal SCLK, which may be bi-directional or uni-directional, and a bi-directional RFFE data signal SDATA that are received by, provided by, or both, the first RFFE circuit 12. During the communications operating mode, the commands provided by the control system 18 may be via the RFFE clock signal SCLK and the RFFE data signal SDATA. The clock information 24 is extracted or determined from the RFFE clock signal SCLK, the RFFE data signal SDATA, or both.

Figure 3G:
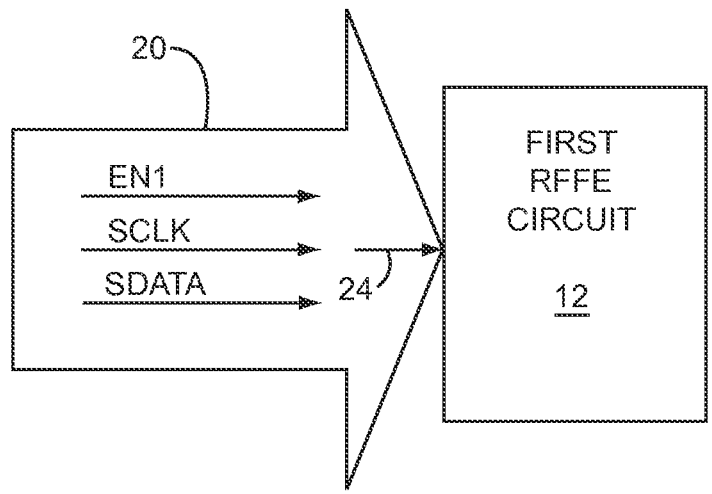
FIG. 3G shows the first RFFE circuit and a portion of the RFFE serial communications bus illustrated in FIG. 1 according to a seventh embodiment of the RFFE serial communications bus.

FIG. 3G shows the first RFFE circuit 12 and a portion of the RFFE serial communications bus 20 illustrated in FIG. 1 according to a seventh embodiment of the RFFE serial communications bus 20. The RFFE serial communications bus 20 illustrated in FIG. 3G is a three-wire bus, which has a uni-directional RFFE clock signal SCLK, a uni-directional RFFE data signal SDATA, and a uni-directional first enable signal EN1 that are received by the first RFFE circuit 12. During the communications operating mode, the commands provided by the control system 18 may be via the RFFE clock signal SCLK, the RFFE data signal SDATA, and the first enable signal EN1. The clock information 24 is extracted or determined from the RFFE clock signal SCLK, the RFFE data signal SDATA, the first enable signal EN1, or any combination thereof.

Figure 3H:
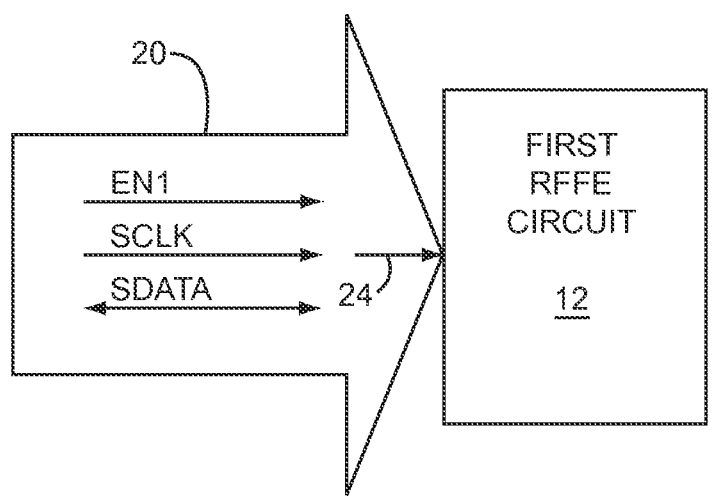
FIG. 3H shows the first RFFE circuit and a portion of the RFFE serial communications bus illustrated in FIG. 1 according to an eighth embodiment of the RFFE serial communications bus.

FIG. 3H shows the first RFFE circuit 12 and a portion of the RFFE serial communications bus 20 illustrated in FIG. 1 according to an eighth embodiment of the RFFE serial communications bus 20. The RFFE serial communications bus 20 illustrated in FIG. 3H is a three-wire bus, which has the RFFE clock signal SCLK, which may be bi-directional or uni-directional, a first enable signal EN1, which may be bi-directional or uni-directional, and a bi-directional RFFE data signal SDATA that are received by, provided by, or both, the first RFFE circuit 12. During the communications operating mode, the commands provided by the control system 18 may be via the RFFE clock signal SCLK, the first enable signal EN1, and the RFFE data signal SDATA. The clock information 24 is extracted or determined from the RFFE clock signal SCLK, the first enable signal EN1, the RFFE data signal SDATA, or any combination thereof.

Figure 4:
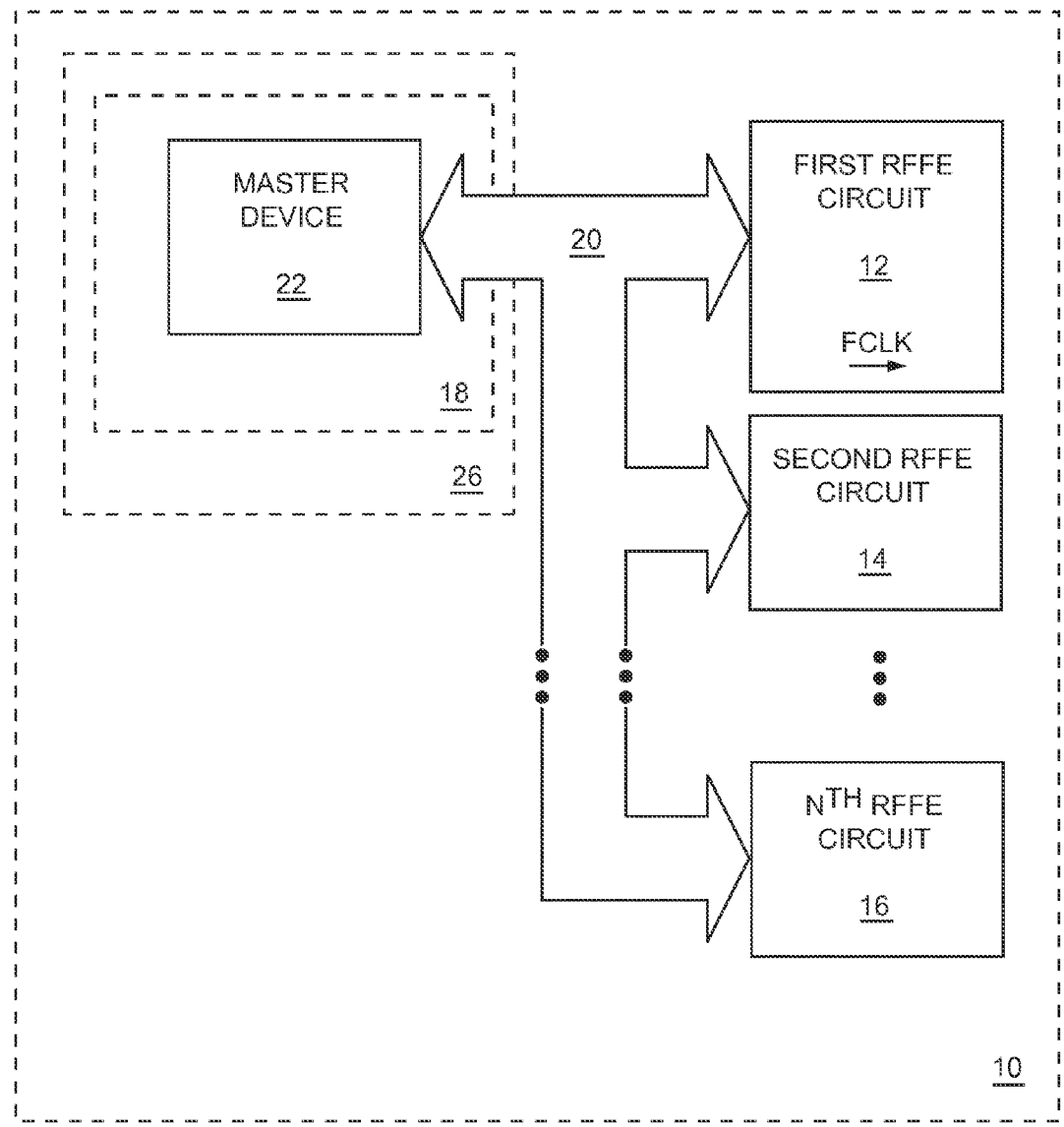
FIG. 4 shows the RFFE circuitry according to an additional embodiment of the RFFE circuitry.

FIG. 4 shows the RFFE circuitry 10 according to an additional embodiment of the RFFE circuitry 10. The RFFE circuitry 10 illustrated in FIG. 4 is similar to the RFFE circuitry 10 illustrated in FIG. 2 except in the RFFE circuitry 10 illustrated in FIG. 4, the RFFE circuitry 10 includes an RF integrated circuit 26, which provides the control system 18. In an alternate, embodiment of the RFFE circuitry 10, the RF integrated circuit 26 provides the control system 18, but the RFFE circuitry 10 does not include the RF integrated circuit 26.

The clock information 24 may be extracted or determined from the RFFE serial communications bus 20 while sending commands over the RFFE serial communications bus 20, which may occur during the communications operating mode. For example, the first RFFE circuit 12 may extract or determine the clock information 24 from commands that are directed toward the first RFFE circuit 12, from commands that are not directed toward the first RFFE circuit 12, from dummy commands that are not detected as valid commands, or any combination thereof. FIGS. 5-11 illustrate different embodiments of extracting or determining the clock information 24 from commands.

Figure 5A:
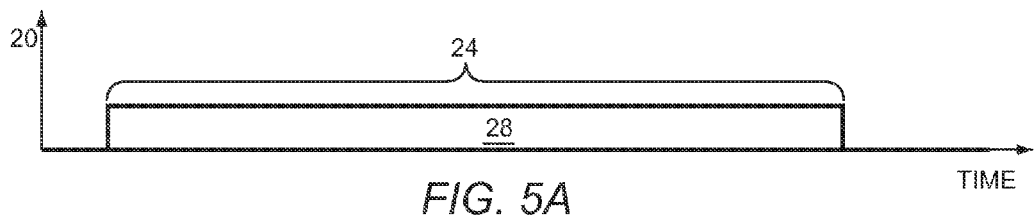
FIG. 5A is a graph illustrating a first command being sent via the RFFE serial communications bus according to one embodiment of the first command.

FIG. 5A is a graph illustrating a first command 28 being sent via the RFFE serial communications bus 20 from the control system 18 according to one embodiment of the first command 28. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24.

Figure 5B:
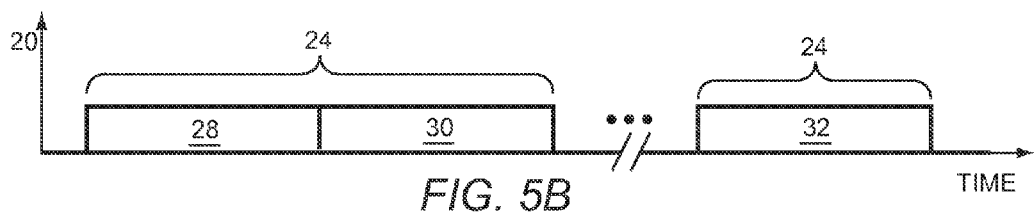
FIG. 5B is a graph illustrating multiple commands being sent via the RFFE serial communications bus according to one embodiment of the multiple commands.

FIG. 5B is a graph illustrating multiple commands being sent via the RFFE serial communications bus 20 from the control system 18 according to one embodiment of the multiple commands. The multiple commands include the first command 28, a second command 30, and up to and including an $M^{TH}$ command 32. The multiple commands 28, 30, 32 may be adjacent to one another. In one embodiment of the multiple commands, M is any whole number. The first RFFE circuit 12 receives and detects the multiple commands 28, 30, 32 and determines clock information 24 that is associated and provided with the multiple commands 28, 30, 32 according to one embodiment of the first RFFE circuit 12. The first RFFE circuit 12 generates at least the first clock signal FCLK based on the clock information 24.

In an alternate embodiment of the whole commands, M is zero, such that the multiple commands include only the first command 28 and the second command 30. The first RFFE circuit 12 receives and detects the first command 28 and the second command 30, which is adjacent to the first command 28. Further, the first RFFE circuit 12 determines clock information 24 that is associated and provided with the first command 28 and the second command 30 according to one embodiment of the first RFFE circuit 12. The first RFFE circuit 12 generates at least the first clock signal FCLK based on the clock information 24.

Figure 5C:
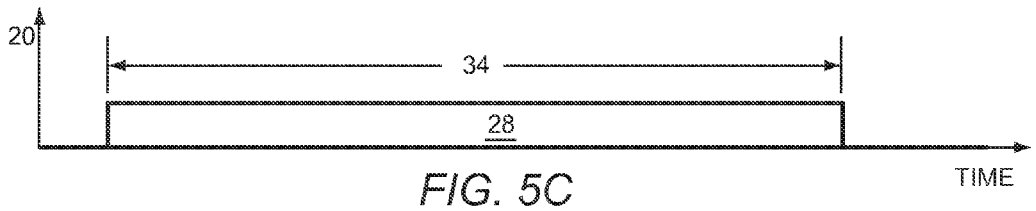
FIG. 5C is a graph illustrating the first command being sent via the RFFE serial communications bus according to one embodiment of the first command.

FIG. 5C is a graph illustrating the first command 28 being sent via the RFFE serial communications bus 20 from the control system 18 according to one embodiment of the first command 28. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 has a normal command size 34 and may be detected as a valid command by the first RFFE circuit 12. The first command 28 may or may not be directed toward the first RFFE circuit 12.

Figure 5D:
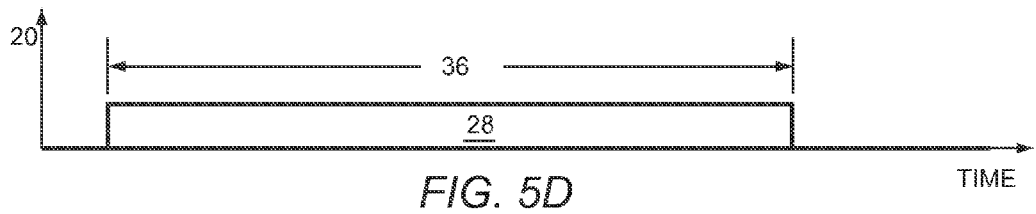
FIG. 5D is a graph illustrating the first command being sent via the RFFE serial communications bus according to an alternate embodiment of the first command.

FIG. 5D is a graph illustrating the first command 28 being sent via the RFFE serial communications bus 20 from the control system 18 according to an alternate embodiment of the first command 28. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 has a short command size 36. As such, the first command 28 is not detected as a valid command by the first RFFE circuit 12, but may be used for the purpose of providing clock information 24. Specifically, the first command 28 is a dummy command having a length, which renders the first command 28 as unrecognizable by the RFFE circuits 12, 14, 16 for the purposes of valid communications.

Figure 5E:
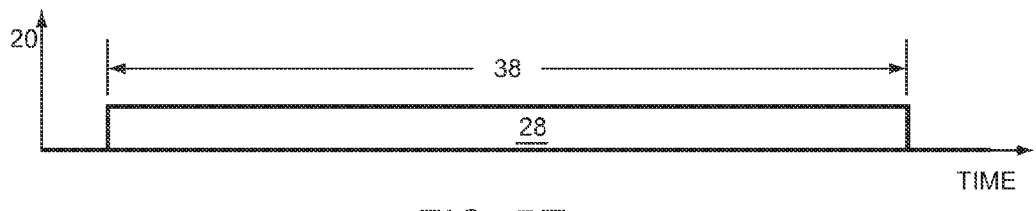
FIG. 5E is a graph illustrating the first command being sent via the RFFE serial communications bus according to an additional embodiment of the first command.

FIG. 5E is a graph illustrating the first command 28 being sent via the RFFE serial communications bus 20 from the control system 18 according to an additional embodiment of the first command 28. The first RFFE circuit 12 receives and detects the first command 28, and determines clock information 24 that is associated and provided with the first command 28 according to one embodiment of the first RFFE circuit 12.

The first RFFE circuit 12 generates at least the first clock signal FCLK based on the clock information 24. The first command 28 has a long command size 38. As such, the first command 28 is not detected as a valid command by the first RFFE circuit 12, but may be used for the purpose of providing clock information 24. Specifically, the first command 28 is a dummy command having a length, which renders the first command 28 as unrecognizable by the RFFE circuits 12, 14, 16 for the purposes of valid communications.

Figure 6A:
FIG. 6A is a graph illustrating a normal command being sent via the RFFE serial communications bus according to one embodiment of the normal command.

FIG. 6A is a graph illustrating a normal command 40 being sent via the RFFE serial communications bus 20 according to one embodiment of the normal command 40. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 is a normal command 40 and may be detected as a valid command by the first RFFE circuit 12. The normal command 40 may or may not be directed toward the first RFFE circuit 12. The normal command 40 illustrated in FIG. 6A includes just a command frame 42. The command frame 42 identifies the type of command.

Figure 6B:
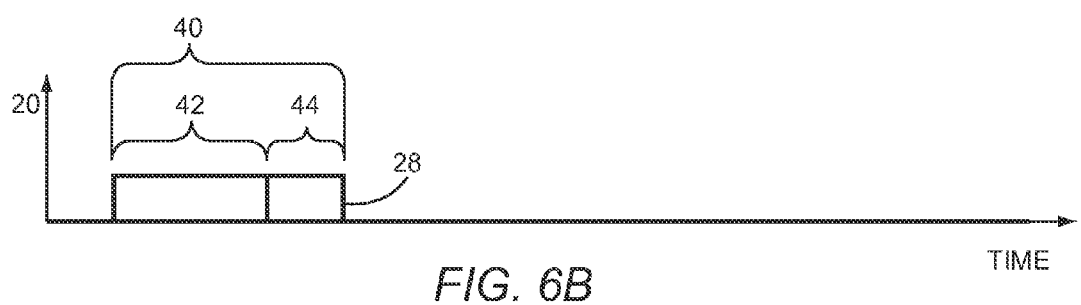
FIG. 6B is a graph illustrating the normal command being sent via the RFFE serial communications bus according to an alternate embodiment of the normal command.

FIG. 6B is a graph illustrating the normal command 40 being sent via the RFFE serial communications bus 20 according to an alternate embodiment of the normal command 40. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 is a normal command 40 and may be detected as a valid command by the first RFFE circuit 12. The normal command 40 may or may not be directed toward the first RFFE circuit 12. The normal command 40 illustrated in FIG. 6B includes both a command frame 42 and a data frame 44. The command frame 42 identifies the type of command and the data frame 44 includes data being transferred between the first RFFE circuit 12 and the control system 18. Alternatively, the data frame 44 includes data being transferred between the first RFFE circuit 12 and other RFFE circuits 14, 16. In one embodiment of the data frame 44, the data frame 44 includes just one byte of data. In an alternate embodiment of the data frame 44, the data frame 44 includes more than one byte of data.

Figure 6C:
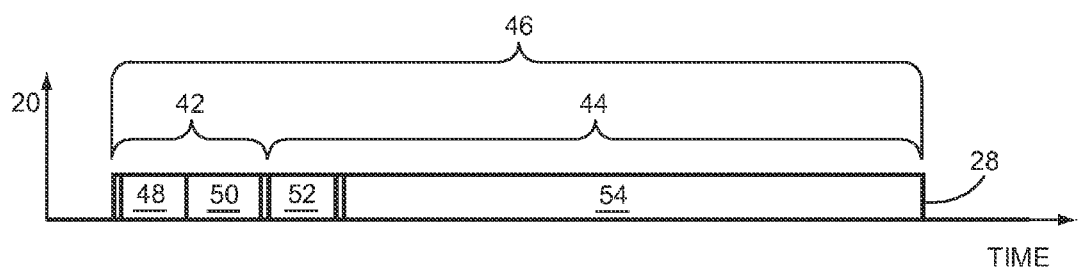
FIG. 6C is a graph illustrating an extended command being sent via the RFFE serial communications bus according to one embodiment of the extended command.

FIG. 6C is a graph illustrating an extended command 46 being sent via the RFFE serial communications bus 20 according to one embodiment of the extended command 46. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 is an extended command 46 and may be detected as a valid command by the first RFFE circuit 12. The extended command 46 may or may not be directed toward the first RFFE circuit 12. The extended command 46 illustrated in FIG. 6C includes both the command frame 42 and the data frame 44.

The command frame 42 includes a slave device address 48 and an RFFE command 50. The data frame 44 includes an address 52 and data 54. The slave device address 48 identifies which of the RFFE circuits 12, 14, 16 the first command 28 is directed toward and the address 52 identifies a location within the RFFE circuit 12, 14, 16 that the first command 28 is directed toward. In one embodiment of the slave device address 48, the slave device address 48 selects the first RFFE circuit 12. In another embodiment of the slave device address 48, the slave device address 48 selects another of the RFFE circuits 12, 14, 16. In an alternate embodiment of the slave device address 48, the slave device address 48 is not associated with a device that is coupled to the RFFE serial communications bus 20. In one embodiment of the RFFE command 50, the RFFE command 50 is a dummy RFFE command. In an exemplary embodiment of the extended command 46, the address 52 has eight bits and the data 54 has at least one and not more than sixteen bytes of data. In one embodiment of the address 52, the address 52 is directed toward an unused location in the first RFFE circuit 12.

Figure 6D:
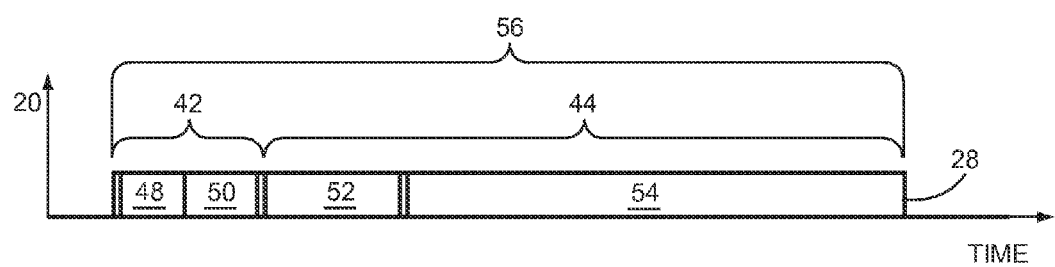
FIG. 6D is a graph illustrating an extended long command being sent via the RFFE serial communications bus according to one embodiment of the extended long command.

FIG. 6D is a graph illustrating an extended long command 56 being sent via the RFFE serial communications bus 20 according to one embodiment of the extended long command 56. The first RFFE circuit 12 receives and detects the first command 28, and determines clock information 24 that is associated and provided with the first command 28 according to one embodiment of the first RFFE circuit 12. The first RFFE circuit 12 generates at least the first clock signal FCLK based on the clock information 24. The first command 28 is an extended long command 56 and may be detected as a valid command by the first RFFE circuit 12. The extended long command 56 may or may not be directed toward the first RFFE circuit 12. The extended long command 56 illustrated in FIG. 6D includes both the command frame 42 and the data frame 44.

The command frame 42 includes the slave device address 48 and the RFFE command 50. The data frame 44 includes the address 52 and the data 54. In an exemplary embodiment of the extended long command 56, the address 52 has sixteen bits and the data 54 has at least one and not more than eight bytes of data. In one embodiment of the address 52, the address 52 is directed toward an unused location in the first RFFE circuit 12.

Figure 6E:
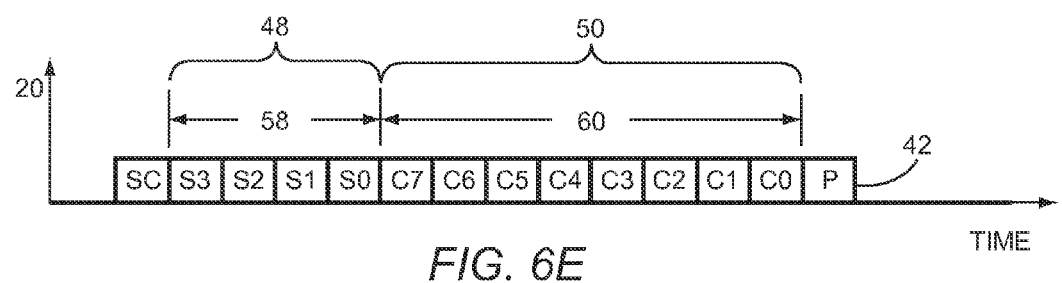
FIG. 6E is a graph illustrating a command frame of the commands illustrated in FIGS. 6A-6D according to one embodiment of the command frame.

FIG. 6E is a graph illustrating the command frame 42 of the commands illustrated in FIGS. 6A-6D according to one embodiment of the command frame 42. The command frame 42 includes the slave device address 48, which has a slave device address length 58, and the RFFE command 50, which has a RFFE command length 60. In an exemplary embodiment of the command frame 42, the command frame 42 may include a synchronization code SC, the slave device address 48 adjacent to the synchronization code SC, the RFFE command 50 adjacent to the slave device address 48, and a parity bit P adjacent to the RFFE command 50. The slave device address length 58 may be four bits and the RFFE command length 60 may be eight bits. Specifically, the slave device address 48 may include a zeroth slave address bit S0, a first slave address bit 51, a second slave address bit S2, and a third slave address bit S3. The RFFE command 50 may include a zeroth RFFE command bit C0, a first RFFE command bit C1, a second RFFE command bit C2, a third RFFE command bit C3, a fourth RFFE command bit C4, a fifth RFFE command bit C5, a sixth RFFE command bit C6, and a seventh RFFE command bit C7.

Several embodiments of the first RFFE circuit 12 (FIG. 1) are associated with FIGS. 7-11, such that during a non-communications operating mode 66 (FIG. 7A), the first RFFE circuit 12 may extract or determine the clock information 24 (FIG. 3), and during a communications operating mode 68 (FIG. 7A), the control system 18 may provide multiple commands on the RFFE serial communications bus 20, such that the first RFFE circuit 12 reacts to at least one or more command on the RFFE serial communications bus 20 (FIG. 1).

Figure 7A:
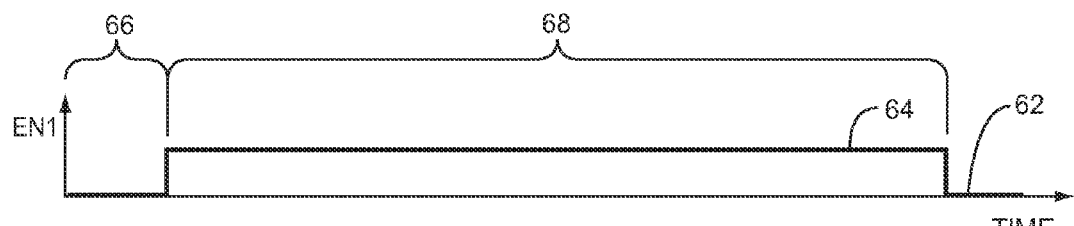
FIG. 7A is a graph illustrating a first enable signal illustrated in FIGS. 3C, 3D, 3G and 3H according to one embodiment of the first enable signal.

FIG. 7A is a graph illustrating the first enable signal EN1 illustrated in FIGS. 3C, 3D, 3G and 3H according to one embodiment of the first enable signal EN1. The first enable signal EN1 is in either a de-asserted state 62 or an asserted state 64. The de-asserted state 62 of the first enable signal EN1 is associated with the non-communications operating mode 66 and the asserted state 64 of the first enable signal EN1 is associated with the communications operating mode 68.

Figure 7B:
FIG. 7B is a graph illustrating an RFFE clock signal illustrated in FIGS. 3E-3H according to one embodiment of the RFFE clock signal.

FIG. 7B is a graph illustrating the RFFE clock signal SCLK illustrated in FIGS. 3E-3H according to one embodiment of the RFFE clock signal SCLK. The RFFE clock signal SCLK illustrated in FIG. 7B correlates with the first enable signal EN1 illustrated in FIG. 7A. During the communications operating mode 68, the RFFE clock signal SCLK may be active to provide commands on the RFFE serial communications bus 20 and has a first RFFE clock period 70. In an exemplary embodiment of the RFFE clock signal SCLK, the first RFFE clock period 70 is such that a frequency of the RFFE clock signal SCLK is less than or equal to about 26 megahertz.

Figure 7C:
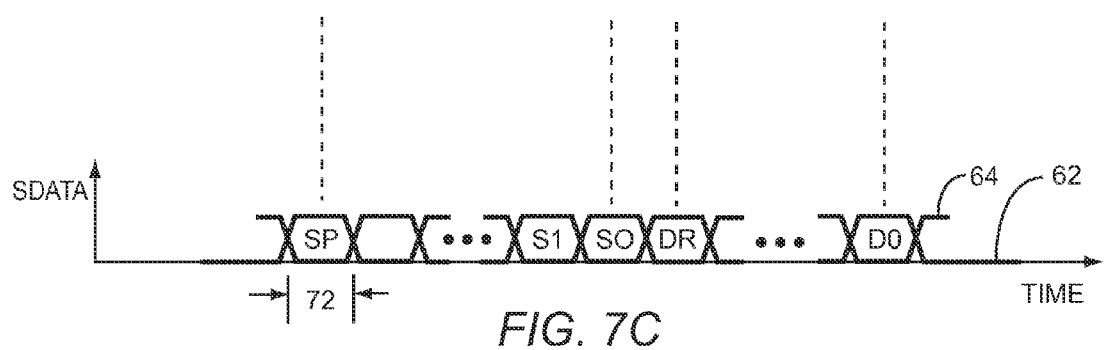
FIG. 7C is a graph illustrating an RFFE data signal illustrated in FIGS. 3E-3H according to one embodiment of the RFFE data signal.

FIG. 7C is a graph illustrating the RFFE data signal SDATA illustrated in FIGS. 3E-3H according to one embodiment of the RFFE data signal SDATA. The RFFE data signal SDATA illustrated in FIG. 7C correlates with the first enable signal EN1 illustrated in FIG. 7A. The RFFE data signal SDATA is in either the de-asserted state 62 or the asserted state 64. During the non-communications operating mode 66, the RFFE data signal SDATA is in the de-asserted state 62 and during the communications operating mode 68, the RFFE data signal SDATA may be in either the de-asserted state 62 or the asserted state 64, depending on the data to be communicated. The RFFE data signal SDATA has an RFFE data period 72.

FIG. 8A is a graph illustrating the first enable signal EN1 illustrated in FIGS. 3C, 3D, 3G and 3H according to one embodiment of the first enable signal EN1. The first enable signal EN1 illustrated in FIG. 8A is in the de-asserted state 62, which is associated with the non-communications operating mode 66. As such, the first RFFE circuit 12 may extract or determine the clock information 24.

FIG. 8B is a graph illustrating the RFFE clock signal SCLK illustrated in FIGS. 3E-3H according to one embodiment of the RFFE clock signal SCLK. The RFFE clock signal SCLK illustrated in FIG. 8B correlates with the first enable signal EN1 illustrated in FIG. 8A. The RFFE clock signal SCLK has the first RFFE clock period 70 and provides the clock information 24 to the first RFFE circuit 12.

FIG. 8C is a graph illustrating the first clock signal FCLK illustrated in FIG. 1 according to one embodiment of the first clock signal FCLK. The first clock signal FCLK illustrated in FIG. 8C correlates with the RFFE clock signal SCLK illustrated in FIG. 8B. The first RFFE circuit 12 provides the first clock signal FCLK based on the clock information 24 extracted from the RFFE clock signal SCLK. As such, a period of the first clock signal FCLK may be about equal to the first RFFE clock period 70.

Figure 9A:
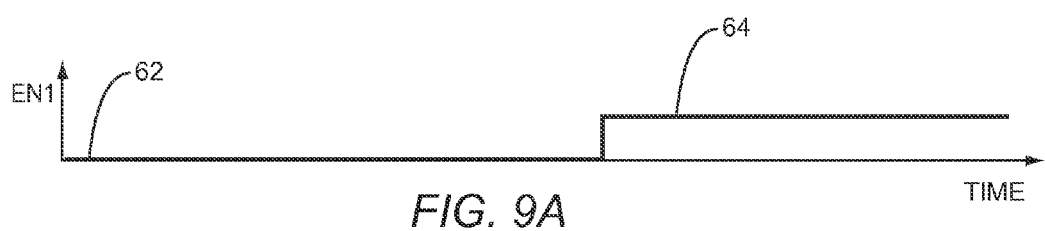
FIG. 9A is a graph illustrating the first enable signal illustrated in FIGS. 3C, 3D, 3G and 3H according to one embodiment of the first enable signal.

FIG. 9A is a graph illustrating the first enable signal EN1 illustrated in FIGS. 3C, 3D, 3G and 3H according to one embodiment of the first enable signal EN1. The first enable signal EN1 illustrated in FIG. 9A begins in the de-asserted state 62, which is associated with the non-communications operating mode 66, and then transitions to the asserted state 64, which is associated with the communications operating mode 68.

Figure 9B:
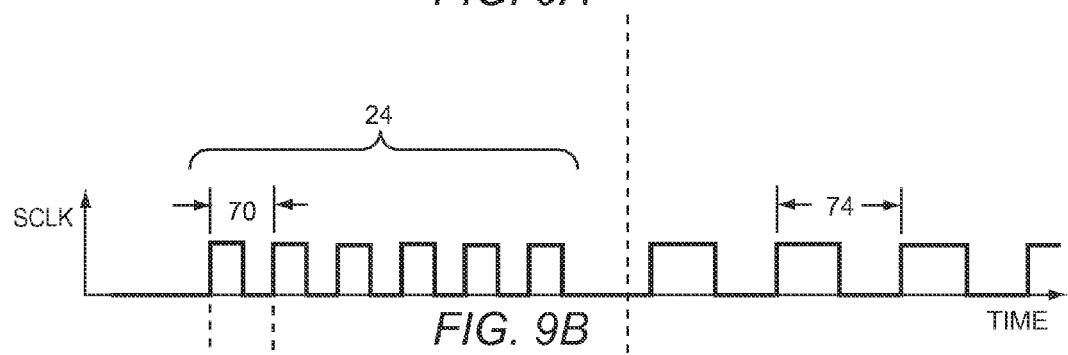
FIG. 9B is a graph illustrating the RFFE clock signal illustrated in FIGS. 3E-3H according to one embodiment of the RFFE clock signal.

FIG. 9B is a graph illustrating the RFFE clock signal SCLK illustrated in FIGS. 3E-3H according to one embodiment of the RFFE clock signal SCLK. The RFFE clock signal SCLK illustrated in FIG. 9B correlates with the first enable signal EN1 illustrated in FIG. 9A. While the first enable signal EN1 is in the de-asserted state 62, the RFFE clock signal SCLK has the first RFFE clock period 70 and provides the clock information 24 to the first RFFE circuit 12. While the first enable signal EN1 is in the asserted state 64, the RFFE clock signal SCLK has a second RFFE clock period 74, which is not equal to the first RFFE clock period 70. As a result, a frequency of the RFFE clock signal SCLK during the non-communications operating mode 66 is not equal to a frequency of the RFFE clock signal SCLK during the communications operating mode 68. While the first enable signal EN1 is in the asserted state 64, the RFFE clock signal SCLK may be active to provide commands on the RFFE serial communications bus 20.

Figure 9C:
FIG. 9C is a graph illustrating the first clock signal illustrated in FIG. 1 according to one embodiment of the first clock signal.

FIG. 9C is a graph illustrating the first clock signal FCLK illustrated in FIG. 1 according to one embodiment of the first clock signal FCLK. The first clock signal FCLK illustrated in FIG. 9C correlates with the RFFE clock signal SCLK illustrated in FIG. 9B. While the first enable signal EN1 is in the de-asserted state 62, the first RFFE circuit 12 provides the first clock signal FCLK based on the clock information 24 extracted from the RFFE clock signal SCLK.

Figure 10A:
FIG. 10A is a graph illustrating the first enable signal illustrated in FIGS. 3C, 3D, 3G and 3H according to one embodiment of the first enable signal.

FIG. 10A is a graph illustrating the first enable signal EN1 illustrated in FIGS. 3C, 3D, 3G and 3H according to one embodiment of the first enable signal EN1. The first enable signal EN1 illustrated in FIG. 10A is in the de-asserted state 62, which is associated with the non-communications operating mode 66. As such, the first RFFE circuit 12 may extract or determine the clock information 24.

Figure 10B:
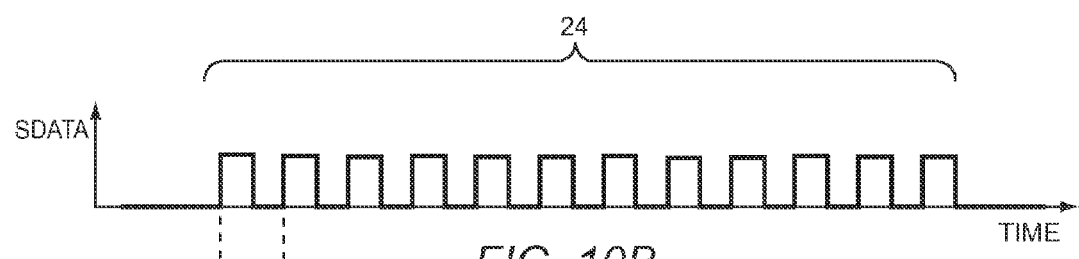
FIG. 10B is a graph illustrating the RFFE data signal illustrated in FIGS. 3E-3H according to one embodiment of the RFFE data signal.

FIG. 10B is a graph illustrating the RFFE data signal SDATA illustrated in FIGS. 3E-3H according to one embodiment of the RFFE data signal SDATA. The RFFE data signal SDATA illustrated in FIG. 10B correlates with the first enable signal EN1 illustrated in FIG. 10A. The RFFE data signal SDATA provides the clock information 24 to the first RFFE circuit 12.

Figure 10C:
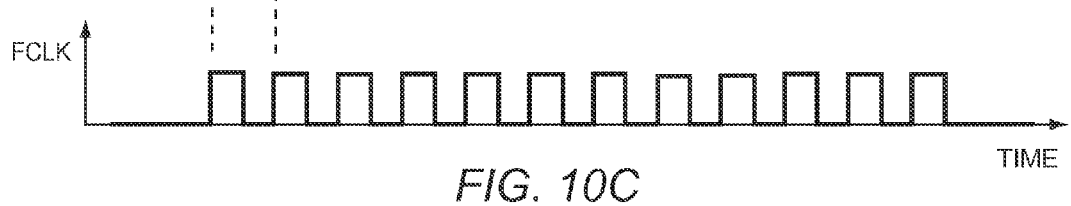
FIG. 10C is a graph illustrating the first clock signal illustrated in FIG. 1 according to one embodiment of the first clock signal.

FIG. 10C is a graph illustrating the first clock signal FCLK illustrated in FIG. 1 according to one embodiment of the first clock signal FCLK. The first clock signal FCLK illustrated in FIG. 10C correlates with the RFFE data signal SDATA illustrated in FIG. 10B. The first RFFE circuit 12 provides the first clock signal FCLK based on the clock information 24 extracted from the RFFE data signal SDATA. As such, a period of the first clock signal FCLK may be about equal to a period of the RFFE data signal SDATA.

Figure 11A:
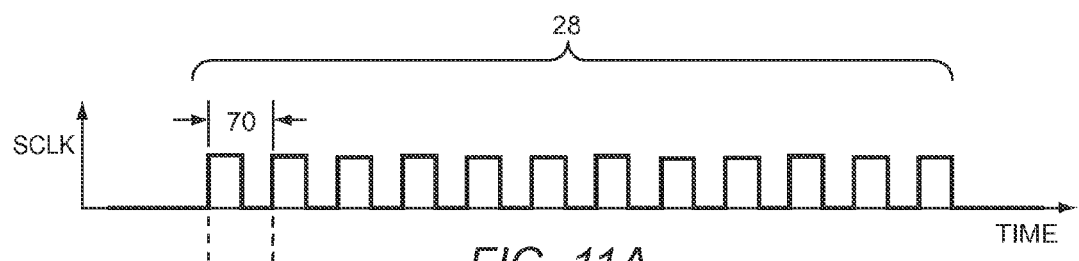
FIG. 11A is a graph illustrating the RFFE clock signal illustrated in FIGS. 3E-3H according to one embodiment of the RFFE clock signal.

FIG. 11A is a graph illustrating the RFFE clock signal SCLK illustrated in FIGS. 3E-3H according to one embodiment of the RFFE clock signal SCLK. The RFFE clock signal SCLK illustrated in FIG. 11A correlates with the first enable signal EN1 illustrated in FIG. 10A. Since the first enable signal EN1 illustrated in FIG. 10A is in the de-asserted state 62, the first RFFE circuit 12 may extract or determine the clock information 24. The RFFE clock signal SCLK has the first RFFE clock period 70 and provides the clock information 24 to the first RFFE circuit 12.

Figure 11B:
FIG. 11B is a graph illustrating the first clock signal illustrated in FIG. 1 according to one embodiment of the first clock signal.

FIG. 11B is a graph illustrating the first clock signal FCLK illustrated in FIG. 1 according to one embodiment of the first clock signal FCLK. The first clock signal FCLK illustrated in FIG. 11B correlates with the RFFE clock signal SCLK illustrated in FIG. 11A. The first RFFE circuit 12 provides the first clock signal FCLK based on the clock information 24 extracted from the RFFE clock signal SCLK. As such, a period of the first clock signal FCLK may be about equal to the first RFFE clock period 70.

Figure 11C:
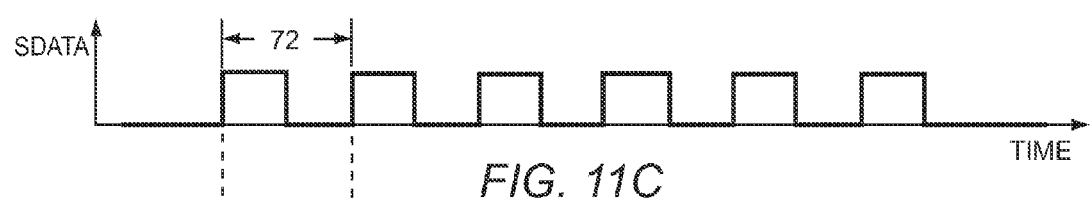
FIG. 11C is a graph illustrating the RFFE data signal illustrated in FIGS. 3E-3H according to one embodiment of the RFFE data signal.

FIG. 11C is a graph illustrating the RFFE data signal SDATA illustrated in FIGS. 3E-3H according to one embodiment of the RFFE data signal SDATA. The RFFE data signal SDATA illustrated in FIG. 11C correlates with the first enable signal EN1 illustrated in FIG. 10A. Since the first enable signal EN1 illustrated in FIG. 10A is in the de-asserted state 62, the first RFFE circuit 12 may further extract or determine the clock information 24. The RFFE data signal SDATA has the RFFE data period 72 and provides the clock information 24 to the first RFFE circuit 12.

Figure 11D:
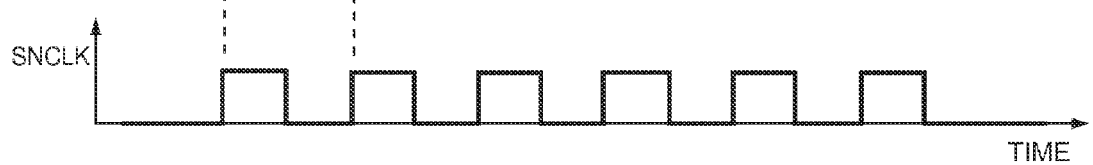
FIG. 11D is a graph illustrating a second clock signal illustrated in FIG. 2 according to one embodiment of the second clock signal.

FIG. 11D is a graph illustrating the second clock signal SNCLK illustrated in FIG. 2 according to one embodiment of the second clock signal SNCLK. The second clock signal SNCLK illustrated in FIG. 11D correlates with the RFFE data signal SDATA illustrated in FIG. 11C. The first RFFE circuit 12 provides the second clock signal SNCLK based on the clock information 24 extracted from the RFFE data signal SDATA. As such, a period of the second clock signal SNCLK may be about equal to the RFFE data period 72.

Figure 12:
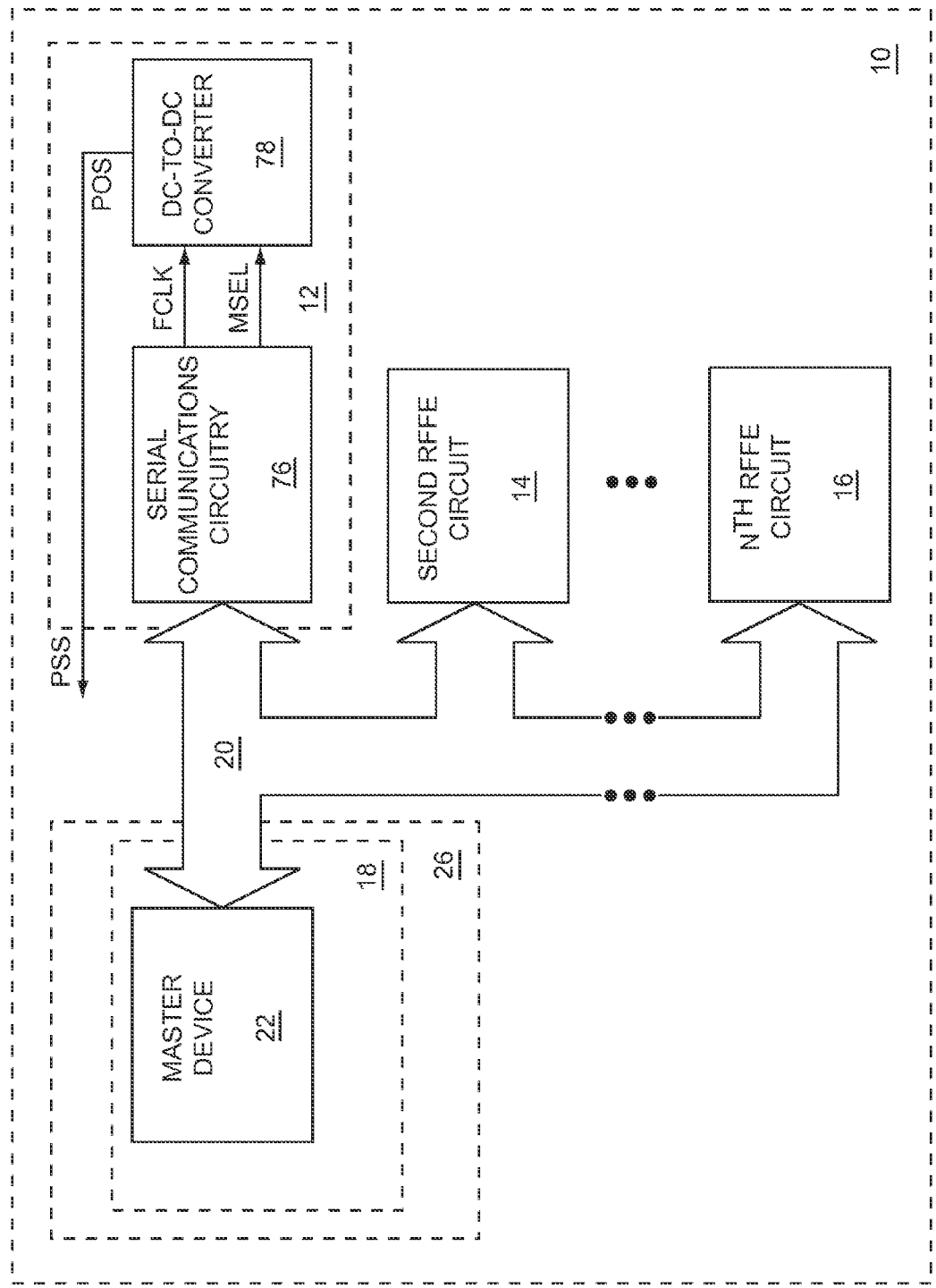
FIG. 12 shows details of the first RFFE circuit illustrated in FIG. 4 according to one embodiment of the first RFFE circuit.

FIG. 12 shows details of the first RFFE circuit 12 illustrated in FIG. 4 according to one embodiment of the first RFFE circuit 12. The first RFFE circuit 12 includes serial communications circuitry 76 and a DC-to-DC converter 78. The serial communications circuitry 76 is coupled to the RFFE serial communications bus 20 and extracts or determines the clock information 24 from the RFFE serial communications bus 20 to provide the first clock signal FCLK to the DC-to-DC converter 78. The serial communications circuitry 76 selects between an open-loop mode and a closed-loop mode. The serial communications circuitry 76 provides a mode select signal MSEL, which is indicative of whether the open-loop mode or the closed-loop mode is selected, to the DC-to-DC converter 78. The DC-to-DC converter 78 provides a power output signal POS based on a DC-to-DC conversion of a DC supply, such as a battery, to the DC-to-DC converter 78. A switching frequency of the DC-to-DC converter 78 may be based on a frequency of the first clock signal FCLK. The power output signal POS may provide a power supply signal PSS to other circuitry (not shown), such as an RF power amplifier.

In one embodiment of the DC-to-DC converter 78, the DC-to-DC converter 78 includes a frequency locked loop (FLL) and operates in either the open-loop mode or the closed-loop mode based on the mode select signal MSEL. The first clock signal FCLK may not always be present. For example, during the non-communications operating mode, the first clock signal FCLK may be present. However, during the communications operating mode, the first clock signal FCLK may not be present. Therefore, during the closed-loop mode, the switching frequency of the DC-to-DC converter 78 is based on a present frequency of the first clock signal FCLK, and during the open-loop mode, the switching frequency of the DC-to-DC converter 78 is based on a previous frequency of the first clock signal FCLK, such that the previous frequency of the first clock signal FCLK is a frequency of the first clock signal FCLK during the closed-loop mode.

Figure 13:
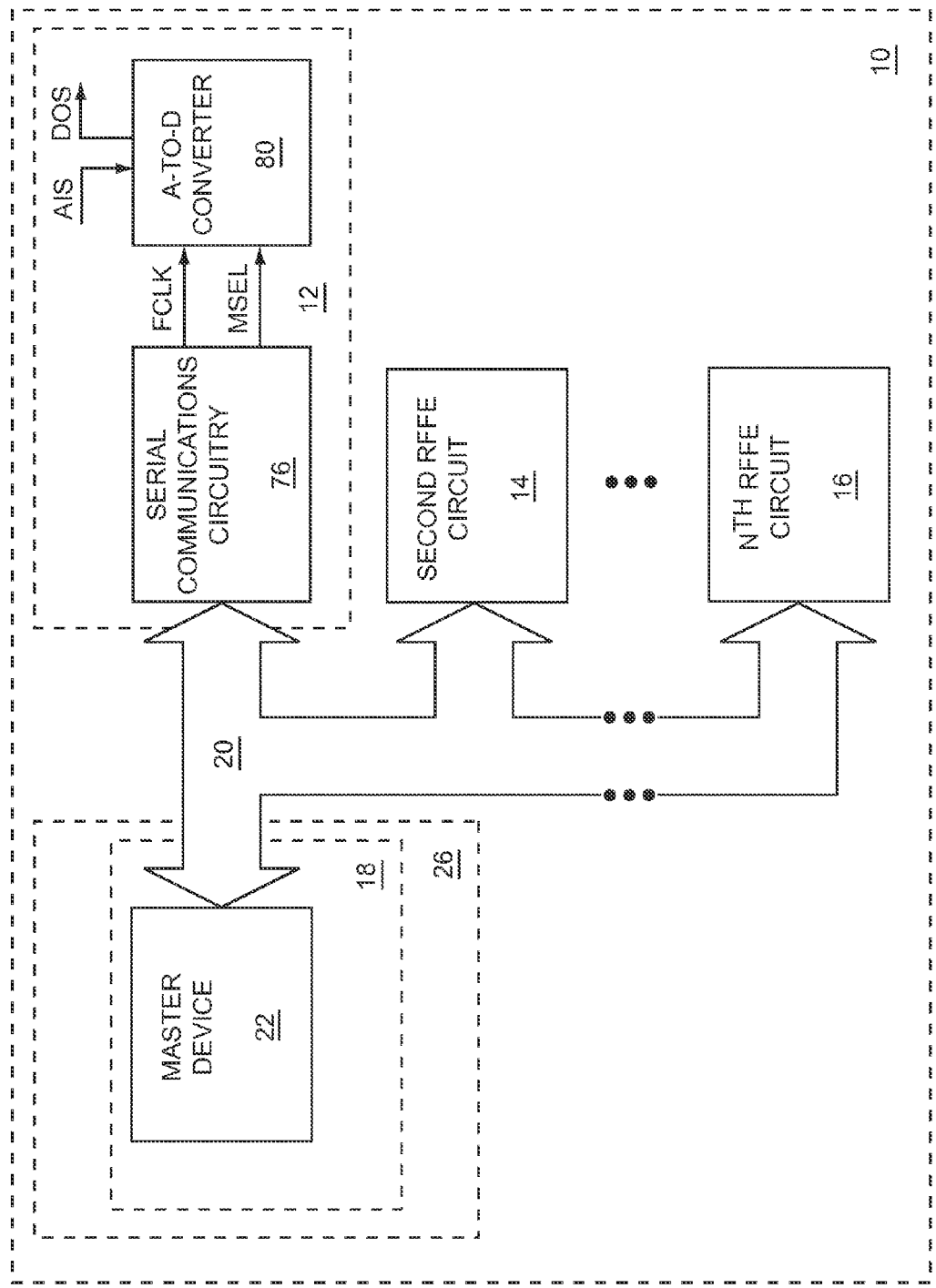
FIG. 13 shows details of the first RFFE circuit illustrated in FIG. 4 according to an alternate embodiment of the first RFFE circuit.

FIG. 13 shows details of the first RFFE circuit 12 illustrated in FIG. 4 according to an alternate embodiment of the first RFFE circuit 12. The first RFFE circuit 12 includes serial communications circuitry 76 and an analog-to-digital converter 80. The serial communications circuitry 76 is coupled to the RFFE serial communications bus 20 and extracts or determines the clock information 24 from the RFFE serial communications bus 20 to provide the first clock signal FCLK to the analog-to-digital converter 80. The serial communications circuitry 76 selects between an open-loop mode and a closed-loop mode. The serial communications circuitry 76 provides the mode select signal MSEL, which is indicative of whether the open-loop mode or the closed-loop mode is selected, to the analog-to-digital converter 80. The analog-to-digital converter 80 receives and converts an analog input signal AIS to a digital output signal DOS using the first clock signal FCLK.

In one embodiment of the analog-to-digital converter 80, the analog-to-digital converter 80 includes an FLL and operates in either the open-loop mode or the closed-loop mode based on the mode select signal MSEL. The first clock signal FCLK may not always be present. For example, during the non-communications operating mode, the first clock signal FCLK may be present. However, during the communications operating mode, the first clock signal FCLK may not be present. Therefore, during the closed-loop mode, the analog-to-digital converter 80 may operate based on a present frequency of the first clock signal FCLK, and during the open-loop mode, the analog-to-digital converter 80 may operate based on a previous frequency of the first clock signal FCLK, such that the previous frequency of the first clock signal FCLK is a frequency of the first clock signal FCLK during the closed-loop mode.

Figure 14:
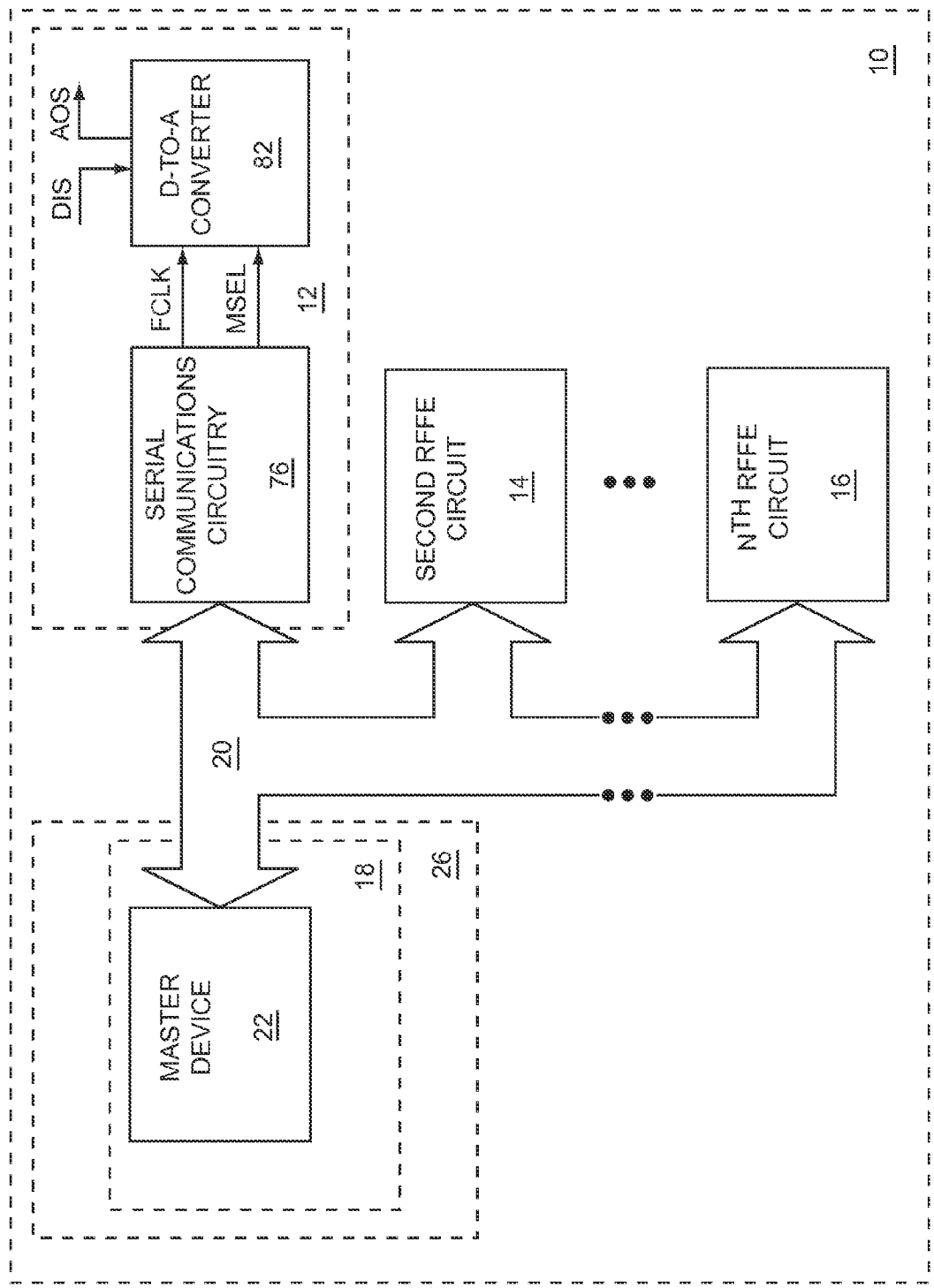
FIG. 14 shows details of the first RFFE circuit illustrated in FIG. 4 according to an additional embodiment of the first RFFE circuit.

FIG. 14 shows details of the first RFFE circuit 12 illustrated in FIG. 4 according to an additional embodiment of the first RFFE circuit 12. The first RFFE circuit 12 includes serial communications circuitry 76 and a digital-to-analog converter 82. The serial communications circuitry 76 is coupled to the RFFE serial communications bus 20 and extracts or determines the clock information 24 from the RFFE serial communications bus 20 to provide the first clock signal FCLK to the digital-to-analog converter 82. The serial communications circuitry 76 selects between an open-loop mode and a closed-loop mode. The serial communications circuitry 76 provides the mode select signal MSEL, which is indicative of whether the open-loop mode or the closed-loop mode is selected, to the digital-to-analog converter 82. The digital-to-analog converter 82 receives and converts a digital input signal DIS to an analog output signal AOS using the first clock signal FCLK.

In one embodiment of the digital-to-analog converter 82, the digital-to-analog converter 82 includes an FLL and operates in either the open-loop mode or the closed-loop mode based on the mode select signal MSEL. The first clock signal FCLK may not always be present. For example, during the non-communications operating mode, the first clock signal FCLK may be present. However, during the communications operating mode, the first clock signal FCLK may not be present. Therefore, during the closed-loop mode, the digital-to-analog converter 82 may operate based on a present frequency of the first clock signal FCLK, and during the open-loop mode, the digital-to-analog converter 82 may operate based on a previous frequency of the first clock signal FCLK, such that the previous frequency of the first clock signal FCLK is a frequency of the first clock signal FCLK during the closed-loop mode.

Figure 15:
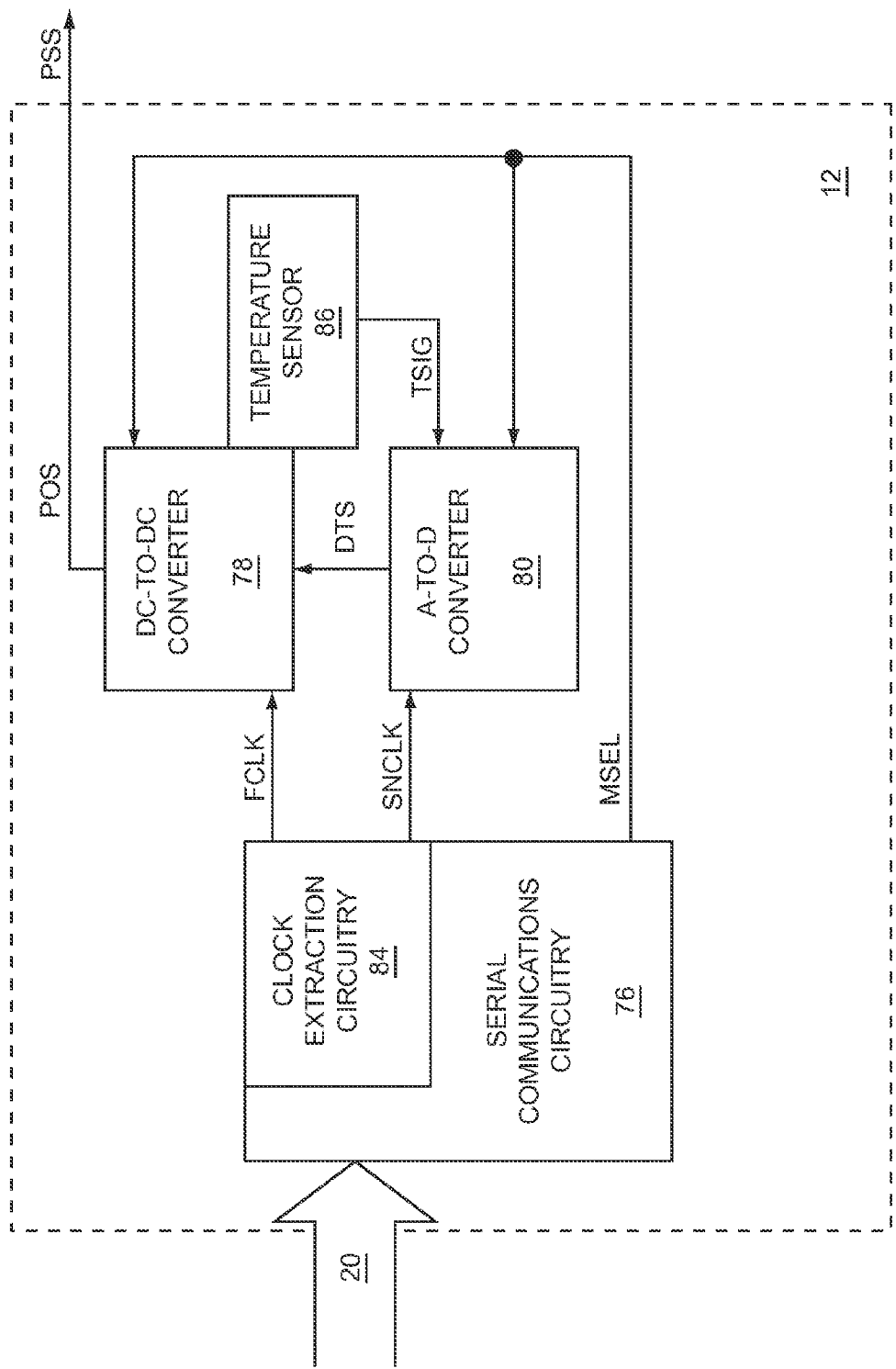
FIG. 15 shows details of the first RFFE circuit and a portion of the RFFE serial communications bus illustrated in FIG. 1 according to one embodiment of the first RFFE circuit.

FIG. 15 shows details of the first RFFE circuit 12 and a portion of the RFFE serial communications bus 20 illustrated in FIG. 1 according to one embodiment of the first RFFE circuit 12. The first RFFE circuit 12 includes the serial communications circuitry 76, the DC-to-DC converter 78, the analog-to-digital converter 80, clock extraction circuitry 84, and a temperature sensor 86. The serial communications circuitry 76 includes the clock extraction circuitry 84, which is coupled to the RFFE serial communications bus 20 and extracts or determines the clock information 24 from the RFFE serial communications bus 20 to provide the first clock signal FCLK to the DC-to-DC converter 78 and to provide the second clock signal SNCLK to the analog-to-digital converter 80. The serial communications circuitry 76 selects between an open-loop mode and a closed-loop mode. The serial communications circuitry 76 provides a mode select signal MSEL, which is indicative of whether the open-loop mode or the closed-loop mode is selected, to the DC-to-DC converter 78 and to the analog-to-digital converter 80. The DC-to-DC converter 78 provides the power output signal POS based on a DC-to-DC conversion of a DC supply (not shown), such as a battery, to the DC-to-DC converter 78. A switching frequency of the DC-to-DC converter 78 may be based on a frequency of the first clock signal FCLK. The power output signal POS may provide a power supply signal PSS to other circuitry (not shown), such as an RF power amplifier.

In one embodiment of the DC-to-DC converter 78, the DC-to-DC converter 78 includes an FLL and operates in either the open-loop mode or the closed-loop mode based on the mode select signal MSEL. The first clock signal FCLK may not always be present. For example, during the non-communications operating mode, the first clock signal FCLK may be present. However, during the communications operating mode, the first clock signal FCLK may not be present. Therefore, during the closed-loop mode, the switching frequency of the DC-to-DC converter 78 is based on a present frequency of the first clock signal FCLK, and during the open-loop mode, the switching frequency of the DC-to-DC converter 78 is based on a previous frequency of the first clock signal FCLK, such that the previous frequency of the first clock signal FCLK is a frequency of the first clock signal FCLK during the closed-loop mode.

The temperature sensor 86 monitors temperature of circuitry within the DC-to-DC converter 78 and provides a temperature signal TSIG to the analog-to-digital converter 80. The temperature signal TSIG is indicative of the monitored temperature of the circuitry within the DC-to-DC converter 78. The analog-to-digital converter 80 receives and converts the temperature signal TSIG to a digital temperature signal DTS using the second clock signal SNCLK. The analog-to-digital converter 80 provides the digital temperature signal DTS to the DC-to-DC converter 78, which controls operation of the DC-to-DC converter 78 based on the digital temperature signal DTS. In one embodiment of the DC-to-DC converter 78, selection between the closed-loop mode and the open-loop mode may be based on temperature drift of the DC-to-DC converter 78.

In one embodiment of the analog-to-digital converter 80, the analog-to-digital converter 80 includes an FLL and operates in either the open-loop mode or the closed-loop mode based on the mode select signal MSEL. The second clock signal SNCLK may not always be present. For example, during the non-communications operating mode, the clock extraction circuitry 84 may generate the second clock signal SNCLK. However, during the communications operating mode, the second clock signal SNCLK may not be present. Therefore, during the closed-loop mode, the analog-to-digital converter 80 may operate based on a present frequency of the second clock signal SNCLK, and during the open-loop mode, the analog-to-digital converter 80 may operate based on a previous frequency of the second clock signal SNCLK, such that the previous frequency of the second clock signal SNCLK is a frequency of the second clock signal SNCLK during the closed-loop mode.

Figure 16:
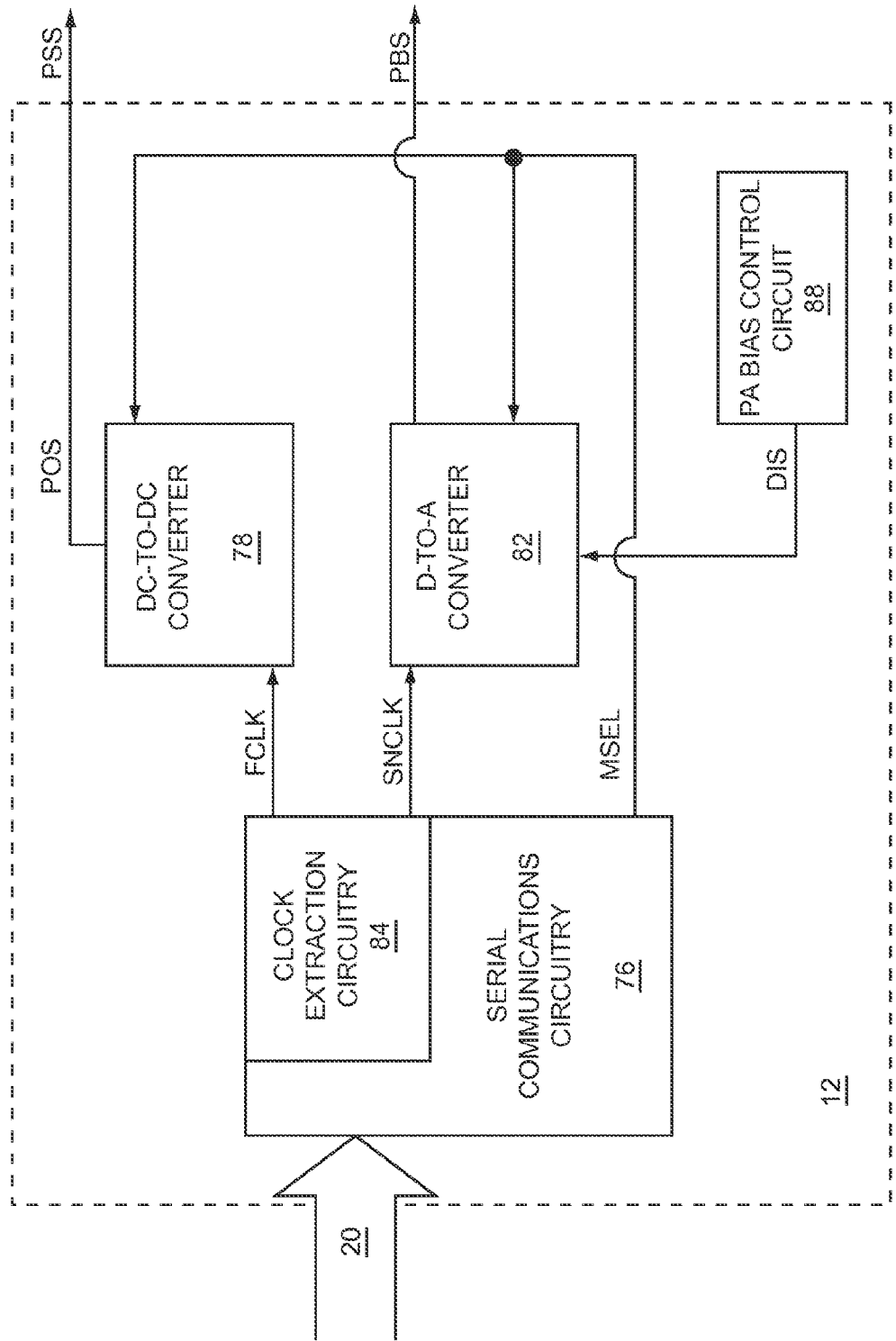
FIG. 16 shows details of the first RFFE circuit and a portion of the RFFE serial communications bus illustrated in FIG. 1 according to an alternate embodiment of the first RFFE circuit.

FIG. 16 shows details of the first RFFE circuit 12 and a portion of the RFFE serial communications bus 20 illustrated in FIG. 1 according to an alternate embodiment of the first RFFE circuit 12. The first RFFE circuit 12 includes the serial communications circuitry 76, the DC-to-DC converter 78, the digital-to-analog converter 82, clock extraction circuitry 84, and a power amplifier bias control circuit 88. The serial communications circuitry 76 includes the clock extraction circuitry 84, which is coupled to the RFFE serial communications bus 20 and extracts or determines the clock information 24 from the RFFE serial communications bus 20 to provide the first clock signal FCLK to the DC-to-DC converter 78 and to provide the second clock signal SNCLK to the digital-to-analog converter 82. The serial communications circuitry 76 selects between the open-loop mode and a closed-loop mode. The serial communications circuitry 76 provides a mode select signal MSEL, which is indicative of whether the open-loop mode or the closed-loop mode is selected, to the DC-to-DC converter 78 and to the digital-to-analog converter 82. The DC-to-DC converter 78 provides the power output signal POS based on a DC-to-DC conversion of a DC supply (not shown), such as a battery, to the DC-to-DC converter 78. A switching frequency of the DC-to-DC converter 78 may be based on a frequency of the first clock signal FCLK. The power output signal POS may provide a power supply signal PSS to other circuitry (not shown), such as an RF power amplifier.

In one embodiment of the DC-to-DC converter 78, the DC-to-DC converter 78 includes an FLL and operates in either the open-loop mode or the closed-loop mode based on the mode select signal MSEL. The first clock signal FCLK may not always be present. For example, during the non-communications operating mode, the first clock signal FCLK may be present. However, during the communications operating mode, the first clock signal FCLK may not be present. Therefore, during the closed-loop mode, the switching frequency of the DC-to-DC converter 78 is based on a present frequency of the first clock signal FCLK, and during the open-loop mode, the switching frequency of the DC-to-DC converter 78 is based on a previous frequency of the first clock signal FCLK, such that the previous frequency of the first clock signal FCLK is a frequency of the first clock signal FCLK during the closed-loop mode.

The power amplifier bias control circuit 88 provides the digital input signal DIS to the digital-to-analog converter 82. The digital input signal DIS is based on a desired power amplifier bias level to an RF power amplifier (not shown). The digital-to-analog converter 82 receives and converts the digital input signal DIS to the analog output signal AOS, which functions as a PA bias signal PBS using the second clock signal SNCLK.

In one embodiment of the digital-to-analog converter 82, the digital-to-analog converter 82 includes an FLL and operates in either the open-loop mode or the closed-loop mode based on the mode select signal MSEL. The second clock signal SNCLK may not always be present. For example, during the non-communications operating mode, the clock extraction circuitry 84 may generate the second clock signal SNCLK. However, during the communications operating mode, the second clock signal SNCLK may not be present. Therefore, during the closed-loop mode, the digital-to-analog converter 82 may operate based on a present frequency of the second clock signal SNCLK, and during the open-loop mode, the digital-to-analog converter 82 may operate based on a previous frequency of the second clock signal SNCLK, such that the previous frequency of the second clock signal SNCLK is a frequency of the second clock signal SNCLK during the closed-loop mode.

Figure 17:
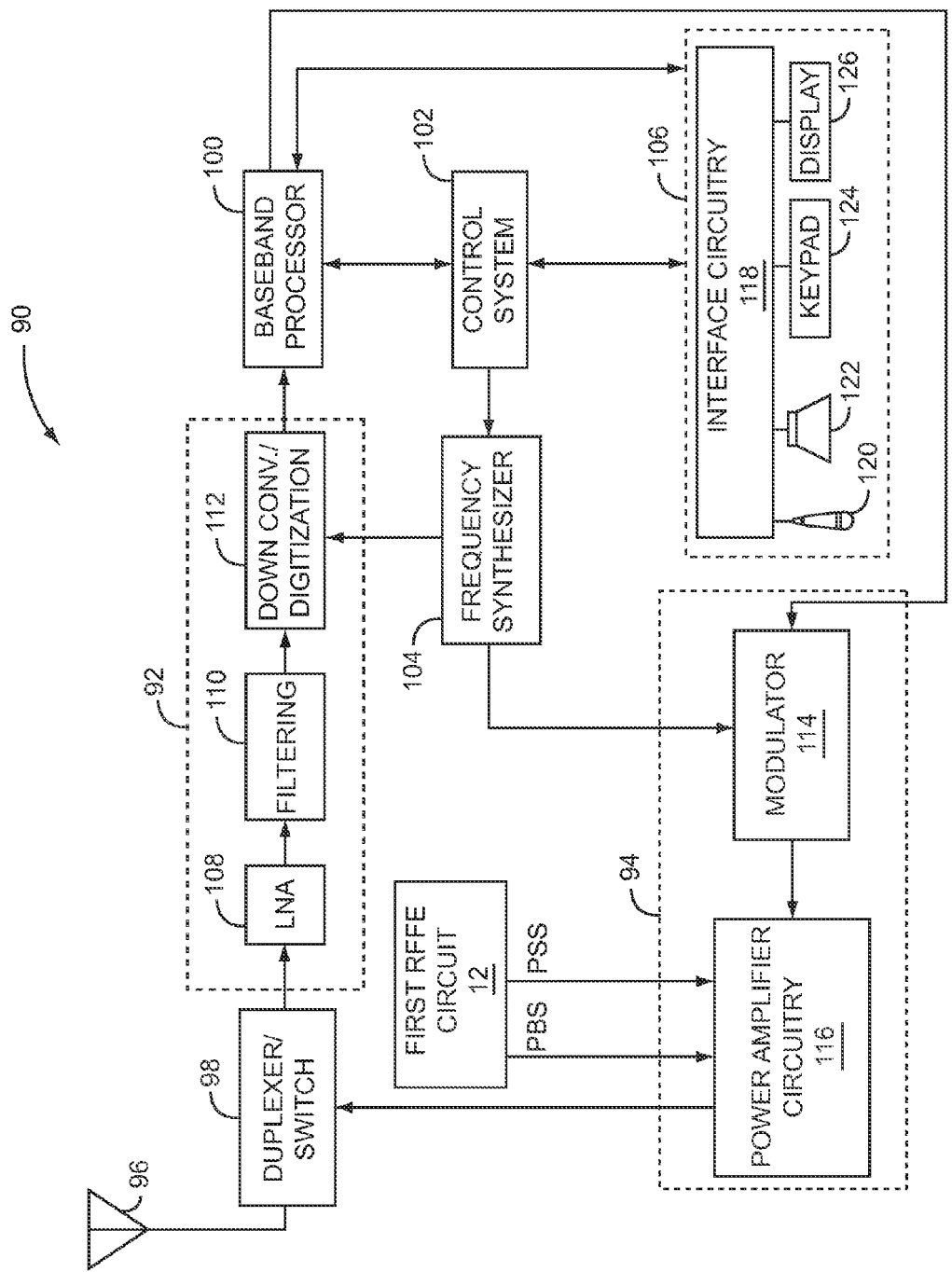
FIG. 17 shows an application example of the present disclosure used in a mobile terminal.

An application example of a first RFFE circuit 12 is its use in a mobile terminal 90, the basic architecture of which is represented in FIG. 17. The mobile terminal 90 may include the first RFFE circuit 12, a receiver front end 92, a radio frequency transmitter section 94, an antenna 96, a duplexer or switch 98, a baseband processor 100, a control system 102, a frequency synthesizer 104, and an interface 106. The receiver front end 92 receives information bearing radio frequency signals from one or more remote transmitters provided by a base station (not shown). In one embodiment of the mobile terminal 90, the receiver front end 92, which is an RF receiver, receives an RF input signal having a receive frequency, such that a frequency of the first clock signal FCLK is selected to avoid de-sensing of the RF receiver at the receive frequency. A low noise amplifier (LNA) 108 amplifies the signal. A filter circuit 110 minimizes broadband interference in the received signal, while down conversion and digitization circuitry 112 down converts the filtered, received signal to an intermediate or baseband frequency signal, which is then digitized into one or more digital streams. The receiver front end 92 typically uses one or more mixing frequencies generated by the frequency synthesizer 104. The baseband processor 100 processes the digitized received signal to extract the information or data bits conveyed in the received signal. This processing typically comprises demodulation, decoding, and error correction operations. As such, the baseband processor 100 is generally implemented in one or more digital signal processors (DSPs).

On the transmit side, the baseband processor 100 receives digitized data, which may represent voice, data, or control information, from the control system 102, which it encodes for transmission. The encoded data is output to the transmitter 94, where it is used by a modulator 114 to modulate a carrier signal that is at a desired transmit frequency. Power amplifier circuitry 116 amplifies the modulated carrier signal to a level appropriate for transmission, and delivers the amplified and modulated carrier signal to the antenna 96 through the duplexer or switch 98. The first RFFE circuit 12 provides the PA bias signal PBS and the power supply signal PSS to the power amplifier circuitry 116. The power amplifier circuitry 116 includes an RF power amplifier, which receives and amplifies an RF signal based on the power supply signal PSS, the PA bias signal PBS, or both to provide an RF output signal. The power supply signal PSS may be a power amplifier envelope power signal.

A user may interact with the mobile terminal 90 via the interface 106, which may include interface circuitry 118 associated with a microphone 120, a speaker 122, a keypad 124, and a display 126. The interface circuitry 118 typically includes analog-to-digital converters, digital-to-analog converters, amplifiers, and the like. Additionally, it may include a voice encoder/decoder, in which case it may communicate directly with the baseband processor 100. The microphone 120 will typically convert audio input, such as the user's voice, into an electrical signal, which is then digitized and passed directly or indirectly to the baseband processor 100. Audio information encoded in the received signal is recovered by the baseband processor 100, and converted by the interface circuitry 118 into an analog signal suitable for driving the speaker 122. The keypad 124 and display 126 enable the user to interact with the mobile terminal 90, input numbers to be dialed, address book information, or the like, as well as monitor call progress information.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Circuitry comprising:
    a first radio frequency front-end (RFFE) circuit coupled to an RFFE serial communications bus and adapted to:
        during a non-communications operating mode, extract clock information, which is provided on the RFFE serial communications bus by a control system, which is adapted to:
            select between a communications operating mode and the non-communications operating mode; and
            during the communications operating mode, provide a plurality of commands on the RFFE serial communications bus; and
        during the non-communications operating mode, generate a first clock signal based on the clock information; and
    at least a second RFFE circuit, such that each of the at least the second RFFE circuit is coupled to the RFFE serial communications bus, and during the communications operating mode, at least the second RFFE circuit is adapted to react to at least one of the plurality of commands.

2. The circuitry of claim 1 wherein the RFFE serial communications bus is adapted to provide and the first RFFE circuit is adapted to receive a first enable signal, which:
    during the communications operating mode, is in an asserted state; and
    during the non-communications operating mode, is in a de-asserted state.

3. The circuitry of claim 1 wherein the RFFE serial communications bus is adapted to provide an RFFE clock signal and an RFFE data signal.

4. The circuitry of claim 3 wherein during the non-communications operating mode:
    the RFFE clock signal is adapted to provide the clock information; and
    the RFFE data signal is in a de-asserted state.

5. The circuitry of claim 3 wherein during the non-communications operating mode, the RFFE data signal is adapted to provide the clock information.

6. The circuitry of claim 3 wherein during the non-communications operating mode:
    the RFFE clock signal is adapted to provide the clock information; and
    a second clock signal is based on the RFFE data signal.

7. The circuitry of claim 3 wherein:
    during the non-communications operating mode, the RFFE clock signal is adapted to provide the clock information and while providing the clock information, the RFFE clock signal has a first frequency; and
    during the communications operating mode, the RFFE clock signal has a second frequency, which is not equal to the first frequency.

8. The circuitry of claim 1 wherein the first RFFE circuit comprises a direct current (DC)-to-DC converter adapted to:

receive the first clock signal, such that a switching frequency of the DC-to-DC converter is based on a frequency of the first clock signal; and
provide a power output signal from the DC-to-DC converter.

9. The circuitry of claim 8 further comprising a radio frequency (RF) power amplifier (PA), which is adapted to receive and amplify an RF signal based on a PA envelope power signal to provide an RF output signal and the power output signal is the PA envelope power signal.

10. The circuitry of claim 8 wherein the power output signal is a power supply signal.

11. The circuitry of claim 8 further comprising an RF receiver, which is adapted to receive an RF input signal having a receive frequency and the frequency of the first clock signal is selected to avoid de-sensing of the RF receiver at the receive frequency.

12. The circuitry of claim 8 wherein:
the DC-to-DC converter comprises a frequency-locked loop (FLL) adapted to operate in one of a closed-loop mode and an open-loop mode;
the first RFFE circuit is further adapted to select between the closed-loop mode and the open-loop mode;
during the closed-loop mode, the switching frequency of the DC-to-DC converter is based on a present frequency of the first clock signal; and
during the open-loop mode, the switching frequency of the DC-to-DC converter is based on a previous frequency of the first clock signal, wherein the previous frequency of the first clock signal is a frequency of the first clock signal during the closed-loop mode.

13. The circuitry of claim 12 wherein the first RFFE circuit:
during the non-communications operating mode, is further adapted to generate a second clock signal based on the clock information; and
further comprises:
a temperature sensor adapted to monitor a temperature of the DC-to-DC converter, such that selection of the one of the closed-loop mode and the open-loop mode is based on temperature drift of the DC-to-DC converter; and
an analog-to-digital converter (ADC) adapted to receive and convert a temperature signal from the temperature sensor into a digital temperature signal using the second clock signal.

14. The circuitry of claim 1 wherein the first RFFE circuit comprises a digital-to-analog converter (DAC) adapted to receive and convert a digital input signal to an analog output signal using the first clock signal.

15. The circuitry of claim 14 further comprising a radio frequency (RF) power amplifier (PA), which is adapted to receive and amplify an RF signal based on a PA bias signal to provide an RF output signal, and the analog output signal is the PA bias signal.

16. The circuitry of claim 1 wherein the control system comprises a master device coupled to the RFFE serial communications bus and each of the first RFFE circuit and the at least the second RFFE circuit is a slave device.

17. The circuitry of claim 1 wherein a radio frequency integrated circuit (RFIC) provides the control system.

18. The circuitry of claim 1 further comprising the control system.

19. A method comprising:
providing a first radio frequency front-end (RFFE) circuit coupled to an RFFE serial communications bus;
during a non-communications operating mode, extracting clock information, which is provided on the RFFE serial communications bus by a control system, which is adapted to:
select between a communications operating mode and the non-communications operating mode; and
during the communications operating mode, provide a plurality of commands on the RFFE serial communications bus; and
during the non-communications operating mode, generate a first clock signal based on the clock information; and
providing at least a second RFFE circuit, such that each of the at least the second RFFE circuit is coupled to the RFFE serial communications bus, and during the communications operating mode, at least the second RFFE circuit is adapted to react to at least one of the plurality of commands.

* * * * *